US009673493B2

(12) United States Patent
Oshima et al.

(10) Patent No.: US 9,673,493 B2
(45) Date of Patent: Jun. 6, 2017

(54) BATTERY TEMPERATURE REGULATING DEVICE

(71) Applicant: Nissan Motor Co., Ltd., Yokohama-shi, Kanagawa (JP)

(72) Inventors: Kentaro Oshima, Kanagawa (JP); Kentaro Hatta, Kanagawa (JP); Qiye Yang, Kanagawa (JP); Yuuki Ogawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/024,049

(22) PCT Filed: Oct. 2, 2014

(86) PCT No.: PCT/JP2014/076449
§ 371 (c)(1),
(2) Date: Mar. 23, 2016

(87) PCT Pub. No.: WO2015/050226
PCT Pub. Date: Apr. 9, 2015

(65) Prior Publication Data
US 2016/0233563 A1 Aug. 11, 2016

(30) Foreign Application Priority Data
Oct. 3, 2013 (JP) .................. 2013-208334

(51) Int. Cl.
*H01M 6/50* (2006.01)
*H01M 10/625* (2014.01)
(Continued)

(52) U.S. Cl.
CPC ....... *H01M 10/625* (2015.04); *H01M 2/1072* (2013.01); *H01M 10/0525* (2013.01);
(Continued)

(58) Field of Classification Search
CPC ........... H01M 10/625; H01M 108/615; H01M 10/6569; H01M 10/613; H01M 2/1072; H01M 10/6563; H01M 10/0525
See application file for complete search history.

(56) References Cited

FOREIGN PATENT DOCUMENTS

| CN | 101898498 A | 12/2010 |
| CN | 102396098 A | 3/2012 |

(Continued)

*Primary Examiner* — Helen O Conley
(74) *Attorney, Agent, or Firm* — Global IP Counselors, LLP

(57) ABSTRACT

A battery temperature regulating device a battery module, a temperature detection device, a battery temperature regulating device, and a battery pack case. The battery temperature regulating device includes a cooling heat exchanger configured to cool air that passes therethrough, a condensed water reservoir configured to store condensed water generated in the cooling heat exchanger, and an air blowing device configured to blow the air in the vicinity of the cooling heat exchanger and the condensed water reservoir and circulate the air within the battery pack case. The battery temperature regulating device is configured to cool the air that passes through the cooling heat exchanger, drive the air blowing device to execute the cooling of the battery module when the temperature of the battery module is higher than a predetermined temperature, and drive only the air blowing device regardless of the temperature of the battery module.

18 Claims, 14 Drawing Sheets

(51) Int. Cl.
    *H01M 10/615*     (2014.01)
    *H01M 10/6569*     (2014.01)
    *H01M 10/613*     (2014.01)
    *H01M 2/10*     (2006.01)
    *H01M 10/6563*     (2014.01)
    *H01M 10/0525*     (2010.01)

(52) U.S. Cl.
    CPC ....... *H01M 10/613* (2015.04); *H01M 10/615* (2015.04); *H01M 10/6563* (2015.04); *H01M 10/6569* (2015.04); *H01M 2220/20* (2013.01)

(56) References Cited

FOREIGN PATENT DOCUMENTS

| | | |
|---|---|---|
| CN | 102950988 A | 3/2013 |
| JP | 2007-26772 A | 2/2007 |
| JP | 2010-76523 A | 4/2010 |
| JP | 2011-198713 A | 10/2011 |
| JP | 2012-109185 A | 6/2012 |
| JP | 2013-134876 A | 7/2013 |

BATTERY TEMPERATURE REGULATING DEVICE

CROSS-REFERENCE TO RELATED APPLICATIONS

This application is a U.S. National Stage Application of International Application No. PCT/JP2014/076449, filed Oct. 2, 2014, which claims priority to Japanese Patent Application No. 2013-208334 filed in the Japan Patent Office on Oct. 3, 2013, the contents of each of which is hereby incorporation herein by reference.

BACKGROUND

Field of Invention

The present invention relates to a battery temperature regulating device for discharging condensed water generated in a battery pack case to the outside.

Background Information

A cooling device of a vehicle mounted battery provided with an opening/closing mechanism comprising a plug member in order to discharge dew condensation water (condensed water) generated in a cooling unit to the outside of a battery case when cooling the battery is known (for example, refer to Japanese Laid-Open Patent Application No. 2011-198713).

SUMMARY

However, in a conventional cooling device of a vehicle mounted battery, if an opening/closing mechanism is provided for the cooling unit, a part for opening/closing, such as a plug member is necessary; therefore, layout space is increased.

In view of the problem described above, an object of the present invention is to provide a battery temperature regulating device that is capable of discharging condensed water to the outside of the battery pack case without increasing the layout space.

In order to achieve the object described above, the battery temperature regulating device of the present invention comprises a battery module, a temperature detection device (means) for detecting the temperature of the battery module, a battery temperature regulating device (means) for adjusting the temperature of the battery module, and a battery pack case for housing the battery module and the battery temperature regulating device.

In this battery temperature regulating device, the battery pack case comprises a vent which allows the passage of gas from inside the battery pack case to the outside. The battery temperature regulating device is configured comprising a cooling heat exchanger for cooling the air that passes through, condensed water reservoir for storing condensed water that is generated in the cooling heat exchanger, and an air blowing device (means) for blowing the air in the vicinity of the cooling heat exchanger and the condensed water reservoir and circulating the same within the battery pack case.

In addition, when the temperature of the battery module detected by the temperature detection device is higher than a predetermined temperature which is set in advance, the battery temperature regulating device cools the air that passes through with the cooling heat exchanger, and drives the air blowing device to execute the cooling of the battery module. Furthermore, the battery temperature regulating device drives only the air blowing device regardless of the temperature of the battery module which is detected by the temperature detection device, at a predetermined timing after the execution of the cooling of the battery module is completed.

Thus, the battery pack case comprises a vent, and only the air blowing device is driven by the battery temperature regulating device regardless of the temperature of the battery module which is detected by the temperature detection device, at a predetermined timing after the execution of the cooling of the battery module is completed.

Therefore, in the battery temperature regulating device, condensed water is generated in the cooling heat exchanger by executing battery cooling (cooling of the battery module), and this condensed water is stored in the condensed water reservoir after executing the battery cooling, which evaporates according to the water vapor partial pressure difference with the surrounding air.

Since only the air blowing device is driven without carrying out cooling by the cooling heat exchanger during this evaporation of condensed water at a predetermined timing, the inside of the battery pack case enters a forced convection state, and the water vapor (air) that is locally generated in the vicinity of the cooling heat exchanger and the condensed water reservoir is diffused into the battery pack case. Accordingly, the gradient of the water vapor partial pressure in the battery pack case is gentle from the vicinity of the cooling heat exchanger and the condensed water reservoir to the vent, and the water vapor partial pressure in the vicinity of the vent becomes greater than the water vapor partial pressure in the vicinity of the vent when the air blowing device is not driven. Therefore, discharging the condensed water that has become water vapor from the vent to the outside of the battery pack case can be carried out efficiently.

As a result, discharging the condensed water to the outside of the battery pack case without increasing the layout space becomes possible, by not adding additional drive parts or the like.

BRIEF DESCRIPTION OF THE DRAWINGS

Referring now to the attached drawings which form a part of this original disclosure.

DETAILED DESCRIPTION OF THE EMBODIMENTS

Figure 1:
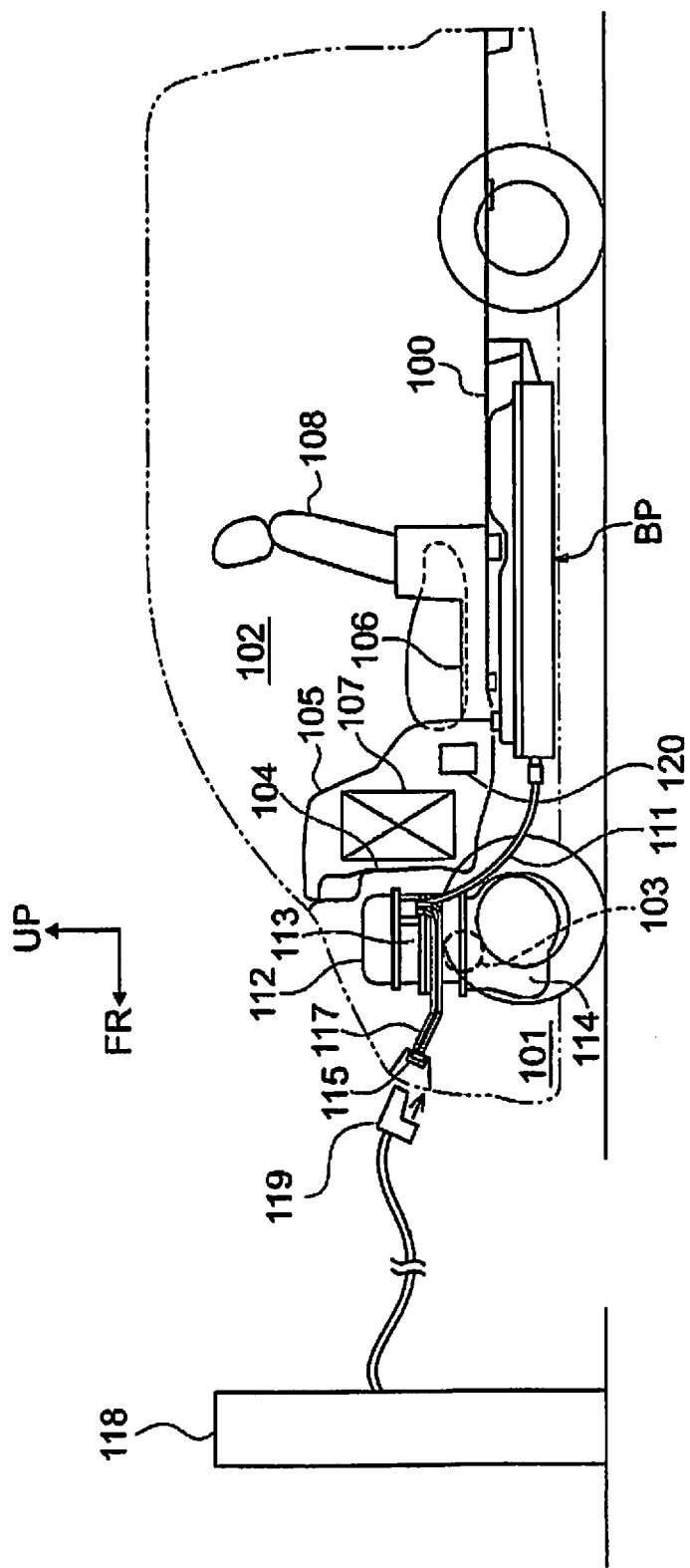
FIG. 1 is a schematic side view illustrating an electric vehicle to which is mounted a battery pack BP that employs the battery temperature regulating device of the first embodiment.

Preferred embodiments for realizing the battery temperature regulating device of the present invention is explained below based on the first embodiment illustrated in the drawings.

First Embodiment

The configuration is described first.

The "vehicle mounting configuration of the battery pack BP," "overall detailed configuration of the battery pack BP," "detailed configuration of the battery temperature regulating device," and the "control system configuration" will be separated described regarding the configuration of the battery temperature regulating device according to the first embodiment.

Vehicle Mounting Configuration of the Battery Pack BP

Figure 2:
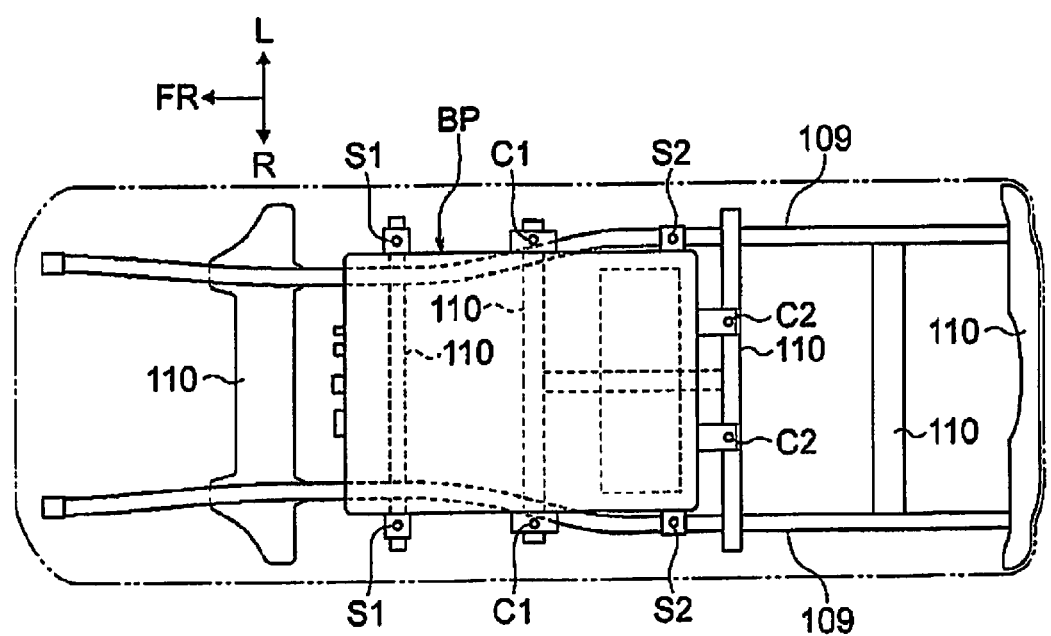
FIG. 2 is a schematic bottom view illustrating an electric vehicle to which is mounted a battery pack BP that employs the battery temperature regulating device of the first embodiment.

FIG. 1 and FIG. 2 illustrate an electric vehicle to which is mounted a battery pack BP that employs the battery temperature regulating device of the first embodiment. The vehicle mounting configuration of the battery pack BP will be described below, based on FIG. 1 and FIG. 2.

The battery pack BP is disposed in the central position of a wheelbase under the floor below the floor panel 100, as illustrated in FIG. 1. The floor panel 100 is disposed in a position that connects with a dash panel 104, which defines the motor room 101 and the vehicle cabin 102, to a vehicle rear end position, and has a flat shape with reduced floor surface irregularities from the front of the vehicle to the rear of the vehicle. The vehicle cabin 102 comprises an instrument panel 105, a center console box 106, an air conditioner unit 107, and a passenger seat 108. An air conditioner compressor 103 for compressing refrigerant that is used in the air conditioner unit 107 is disposed in the motor room 101 in the front of the vehicle.

The battery pack BP is supported at eight points with respect to a vehicle body member, which is a vehicle body strength member, as illustrated in FIG. 2. The vehicle body member is configured comprising a pair of side members 109, 109 that extend in the vehicle longitudinal direction, and a plurality of cross members 110, 110, which connect the pair of side members 109, 109 in the vehicle width direction. The two sides of the battery pack BP are supported at six points by a pair of first side member support points S1, S1, a pair of first cross member support points C1, C1, and a pair of second side member support points S2, S2. The rear side of the battery pack BP is supported at two points by a pair of second cross member support points C2, C2.

The battery pack BP (high power battery) is connected with a power electric module 112 (DC/DC converter+charger+12V battery) which is disposed in the motor room 101, via a charge/discharge harness 111 which is routed in the vehicle longitudinal direction along the dash panel 104, as illustrated in FIG. 1. Power from the battery pack BP (high power battery) is supplied to the 12V battery via the DC/DC converter during vehicle startup. Other than the power electric module 112, this motor room 101 includes an inverter 113 and a motor drive unit 114 (traveling motor+reduction gear+differential gear). The traveling motor of the motor drive unit 114 is an AC motor, which is driven by the DC power that is outputted from the battery pack BP (battery stack 2 inside the battery pack BP) being converted to AC power and supplied by the inverter 113. A charging port 115 having a charge port lid is disposed in the vehicle front face position, and the charging port 115 is connected to the power electric module 112 by a charging harness 117. The charging port 115 is configured so that a charging gun 119 (charging connector) that is connected to a charging station 118 (external power source), which is a power source outside of the vehicle, is connectable and disconnectable relative thereto; with the charging gun 119 being connected to the charging port 115, a battery stack 2 inside the battery pack BP described below and the charging station 118 become electrically connected, and the battery stack 2 is capable of being charged (quick charge or normal charge) by the power that is outputted (supplied) from the charging station 118. The connection/disconnection of the charging gun 119 to the charging port 115 is carried out by a user of the vehicle inserting and removing the charging gun 119 to and from the charging port 115.

The battery pack BP is connected to an integrated controller 120 via a bidirectional communication line such as a CAN cable, which is not shown, as well as connected to a vehicle mounted air conditioning system comprising an air conditioner unit 107 which is disposed in the instrument panel 105. That is, a battery discharge control (powering control), a battery charge control (quick charge control/normal charge control/regenerative control) and the like are carried out, and the internal temperature of the battery pack BP (battery temperature) is managed and controlled by the conditioned air by the cold air and warm air.

Overall Detailed Configuration of the Battery Pack BP

Figure 3:
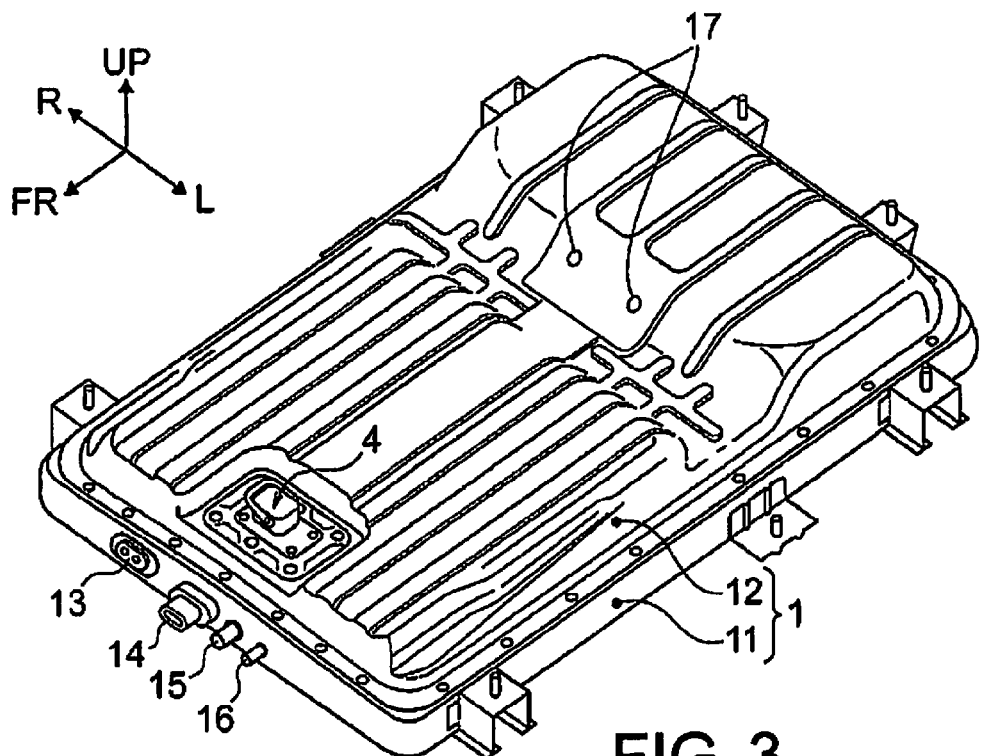
FIG. 3 is an overall perspective view illustrating a battery pack BP that employs the battery temperature regulating device of the first embodiment.
Figure 4:
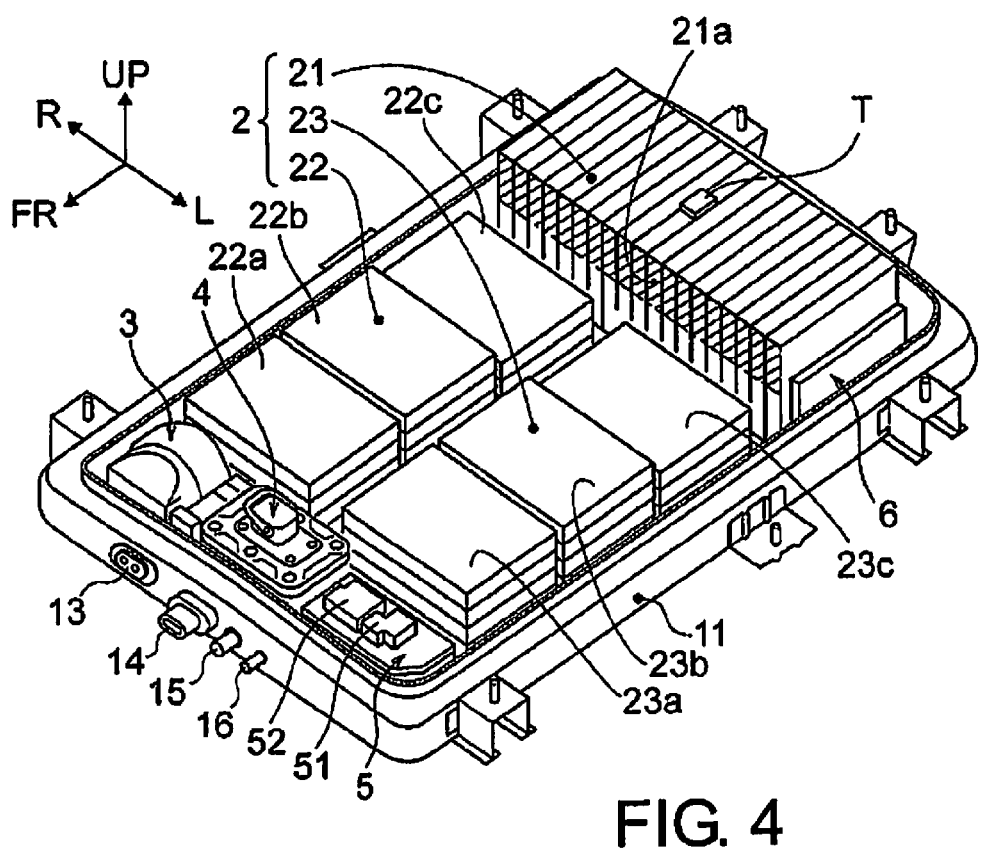
FIG. 4 is a perspective view illustrating a battery pack BP that employs the battery temperature regulating device of the first embodiment with the battery pack case upper cover removed.

FIG. 3 and FIG. 4 illustrate the details of a battery pack BP that employs the battery temperature regulating device of the first embodiment. The overall detailed configuration of the battery pack BP will be described below, based on FIG. 3 and FIG. 4.

The battery pack BP of the first embodiment comprises a battery pack case 1, a battery stack 2, a temperature regulation unit 3, a service disconnect switch 4 (heavy current cutoff switch: hereinafter referred to as "SD switch."), a junction box 5, and a Li-Ion battery controller 6 (hereinafter referred to as "LB controller."), as illustrated in FIG. 3 and FIG. 4.

The battery pack case 1 is configured from two parts, a battery pack lower frame 11 and a battery pack upper cover 12, as illustrated in FIG. 3 and FIG. 4. Then, by affixing the two parts by bolting, interposed with an annular sealing member which runs continuously along the outer perimeter edges of the battery pack lower frame 11 and the battery pack upper cover 12, a watertight structure capable of preventing the entry of water from the outside is configured.

The battery pack lower frame 11 is a frame member that is supported and affixed to the vehicle body member, as illustrated in FIG. 4. This battery pack lower frame 11 comprises a square recessed space for mounting the battery stack 2 and other pack components 3, 4, 5, 6. A refrigerant tube connector terminal 13, a charge/discharge connector terminal 14, a heavy current connector terminal 15 (for air conditioning the cabin interior), and a weak current connector terminal 16 are mounted to the front edge of the frame of this battery pack lower frame 11.

The battery pack upper cover 12 is a cover member for covering the battery pack lower frame 11 in a watertight state, as illustrated in FIG. 3. Of the pack components 2, 3, 4, 5, 6 mounted on the battery pack lower frame 11, this battery pack upper cover 12 comprises in particular a cover surface formed from an uneven stepped surface shape corresponding to the uneven height shape of the battery stack 2. In addition, the battery pack upper cover 12 comprises two vents 17 for discharging the air inside the battery pack case 1 (including the water vapor of the condensed water.) to the outside of the battery pack case 1, as illustrated in FIG. 3. The vent 17 is preferably configured to allow the passage of gas from the inside of the battery pack case 1 to the outside, as well as to prevent the passage of liquid from the outside of the battery pack case 1 to the inside. For example, a configuration using a material (film) that allows the passage of gas while preventing the passage of liquid, such as Gore-Tex (registered trademark), is conceivable.

The battery stack 2 (battery modules) is mounted on the battery pack lower frame 11, and is configured by a tripartite stack of a first battery stack 21, a second battery stack 22, and a third battery stack 23, as illustrated in FIG. 4. Each of the battery stacks 21, 22, 23 has a substantially rectangular shape battery module (battery unit) comprising secondary batteries (lithium ion battery, etc.) as a structural unit, and is a laminate structure obtained by stacking a plurality of battery modules in the short side direction. The detailed configuration of each of the battery stacks 21, 22, 23 is as follows.

The first battery stack 21 is mounted in the vehicle rear region of the battery pack lower frame 11, as illustrated in FIG. 4. This first battery stack 21 is configured by a vertical stack (for example vertically stacking 20 modules), achieved by preparing a plurality of battery modules stacked in the short side direction, and mounting while matching the stacking direction of the battery modules and the vehicle width direction.

Pairs of each of the second battery stack 22 and the third battery stack 23 are mounted separated to the left and right in the vehicle width direction in a vehicle central region of the battery pack lower frame 11, further on the front side than the first battery stack 21, as illustrated in FIG. 4. The second battery stack 22 and the third battery stack 23 are configured by flat stacking according to the same exact pattern. That is, a plurality of those obtained by stacking a plurality (for example four and five) of battery modules in the short side direction (for example, one set of four stacked and two sets of five stacked) are prepared. Then, for example, those in a flat stacked state, in which the vehicle vertical direction and the stacking direction of the battery modules are matched, are aligned in the vehicle longitudinal direction from the rear of the vehicle to the front of the vehicle in sequence: four flat stacked/five flat stacked/five flat stacked. The second battery stack 22 comprises front side battery stack parts 22a, 22b, and a rear side battery stack part 22c, with a height dimension that is lower than the front side battery stack parts 22a, 22b by one module, as illustrated in FIG. 4. The third battery stack 23 comprises front side battery stack parts 23a, 23b, and a rear side battery stack part 23c, with a height dimension that is lower than the front side battery stack parts 23a, 23b by one module, as illustrated in FIG. 4.

The temperature regulation unit 3 is arranged in a right side region of a vehicle front side space of the battery pack lower frame 11, and blows conditioned air (cold air, warm air) to an air distribution duct 9 of the battery pack BP described below, as illustrated in FIG. 4.

The SD switch 4 is a switch that mechanically interrupts the battery heavy current circuit by a manual operation, arranged in the central region of the vehicle front side space of the battery pack lower frame 11, as illustrated in FIG. 3 and FIG. 4. The battery heavy current circuit is formed by connecting each of the battery stacks 21, 22, 23 equipped with an internal bus bar, the junction box 5, and the SD switch 4 to each other via the bus bar. This SD switch 4 is switched between switch on and switch off by manual operation, when carrying out inspection, repair, parts replacement, etc., of the power electric module 112, the inverter 113, or the like.

The junction box 5 is arranged in the left side region of the vehicle front side space of the battery pack lower frame 11, and centrally carries out the supply/interruption/distribution of heavy current by a relay circuit, as illustrated in FIG. 3 and FIG. 4. A temperature regulation relay 51 and a temperature regulation controller 52 for controlling the temperature regulation unit 3 are installed in this junction box 5. The junction box 5 and the external power electric module 112 are connected via the charge/discharge connector terminal 14 and the charge/discharge harness 111. The junction box 5 and the integrated controller 120 are connected via a weak current harness.

The LB controller 6 is disposed in the left side end surface position of the first battery stack 21, and carries out the capacity management/temperature management/voltage management of the battery stacks 21, 22, 23, as illustrated in FIG. 4. This LB controller 6 acquires battery capacity information, battery temperature information, and battery voltage information, by a calculation process based on a temperature detection signal that is inputted from a temperature sensor T (FIG. 4) in contact with the upper surface of the battery module in the center of the left and right directions of the vehicle of the first battery stack 21 via a temperature detection signal line, a battery voltage detection value from a battery voltage detection line, and a battery current detection signal from a battery current detection signal line. The LB controller 6 and the integrated controller 120 are then connected via the weak current harness, which transmits battery temperature information, battery capacity information, and ON/OFF information of the relay circuit, and the like.

While the temperature sensor T is a temperature sensor that detects the ambient temperature inside the battery pack as the temperature of the battery module (internal temperature of the battery pack BP, battery temperature), the temperature sensor may be one that is in direct contact with the battery module to detect the temperature of the battery module. In addition, while FIG. 4 describes a single temperature sensor T, a plurality of temperature sensors T may be provided as well. When providing a plurality of temperature sensors T, the LB controller 6 may detect the maximum temperature, or the average value, of the plurality of detected battery module temperatures as the temperature of the battery module.

Detailed Configuration of the Battery Temperature Regulating Device

FIG. 5 thru FIG. 10 illustrates the details of the battery temperature regulating device of the first embodiment mounted on a battery pack BP. The detailed configuration of the battery temperature regulating device will be described below, based on FIG. 5 thru FIG. 10.

Figure 5:
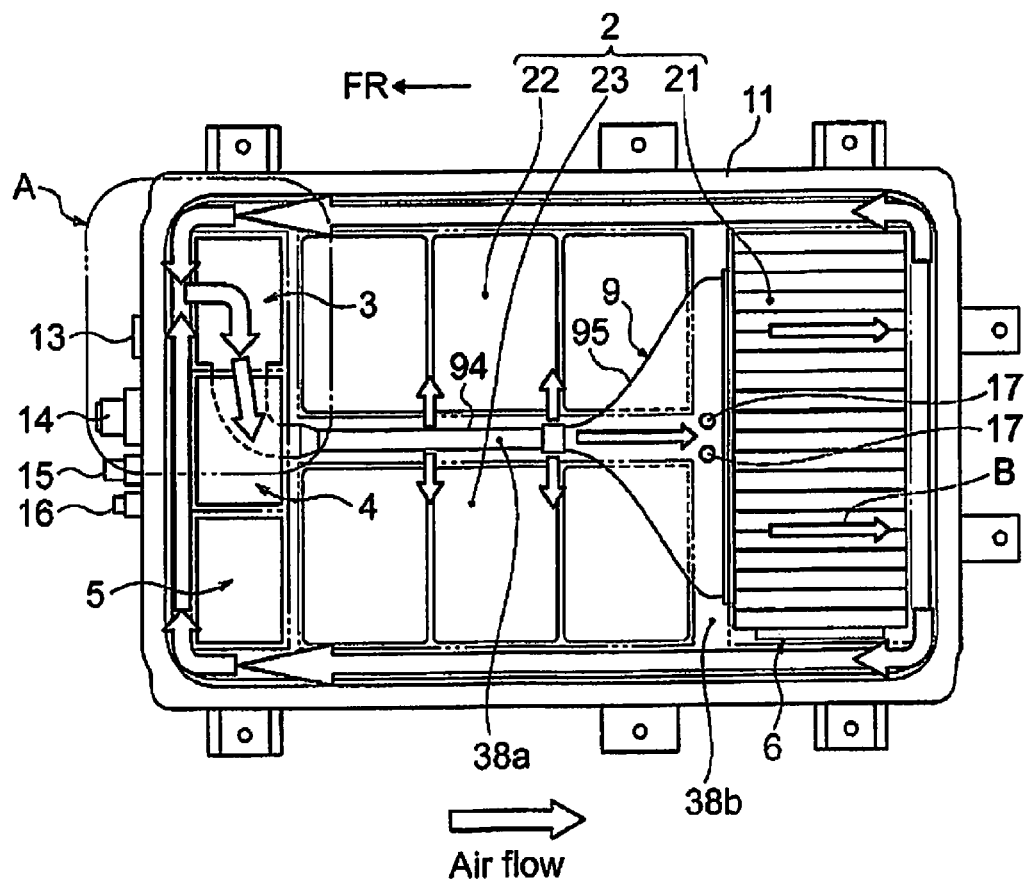
FIG. 5 is a plan view illustrating the flow of conditioned air and the internal configuration of a battery pack BP that employs the battery temperature regulating device of the first embodiment, with the battery pack case upper cover removed.

The battery temperature regulating device comprises a first battery stack 21, a second battery stack 22, a third battery stack 23, a temperature regulation unit 3 (battery temperature regulating means or device), and an air distribution duct 9 (duct), as illustrated in FIG. 5.

The first battery stack 21 is housed and arranged in a vehicle rear region of the internal space of the battery pack case 1. The second and third battery stacks 22, 23 are housed and arranged further in the vehicle front region of the internal space of the battery pack case 1 than the first battery stack 21, and the stack heights thereof are set lower than the first battery stack 21.

Figure 6:
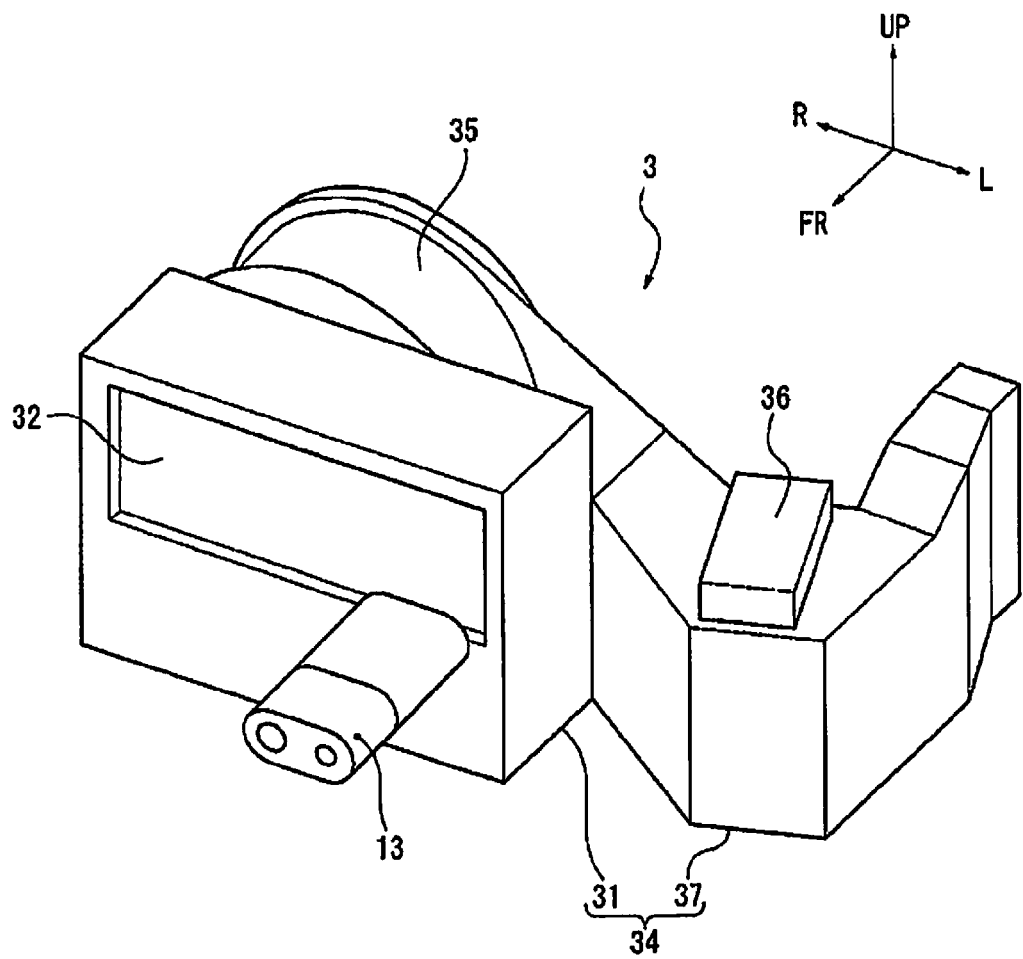
FIG. 6 is a perspective view illustrating the temperature regulation structure in the periphery of a temperature regulation unit.
Figure 7:
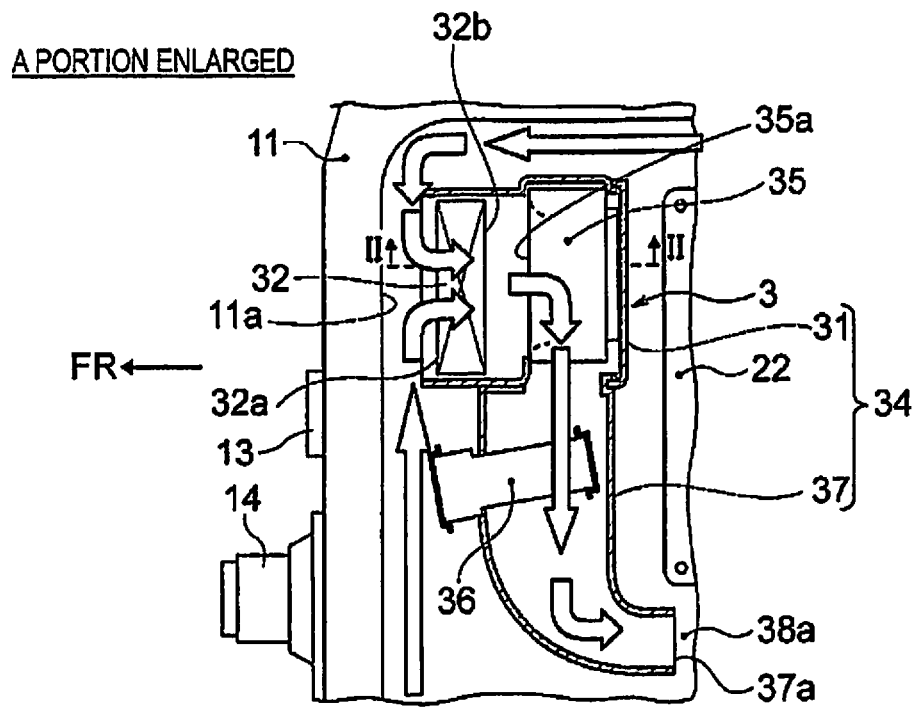
FIG. 7 is an enlarged view of the A portion in FIG. 5, illustrating the flow of conditioned air and the temperature regulation structure in the periphery of the temperature regulation unit.
Figure 8:
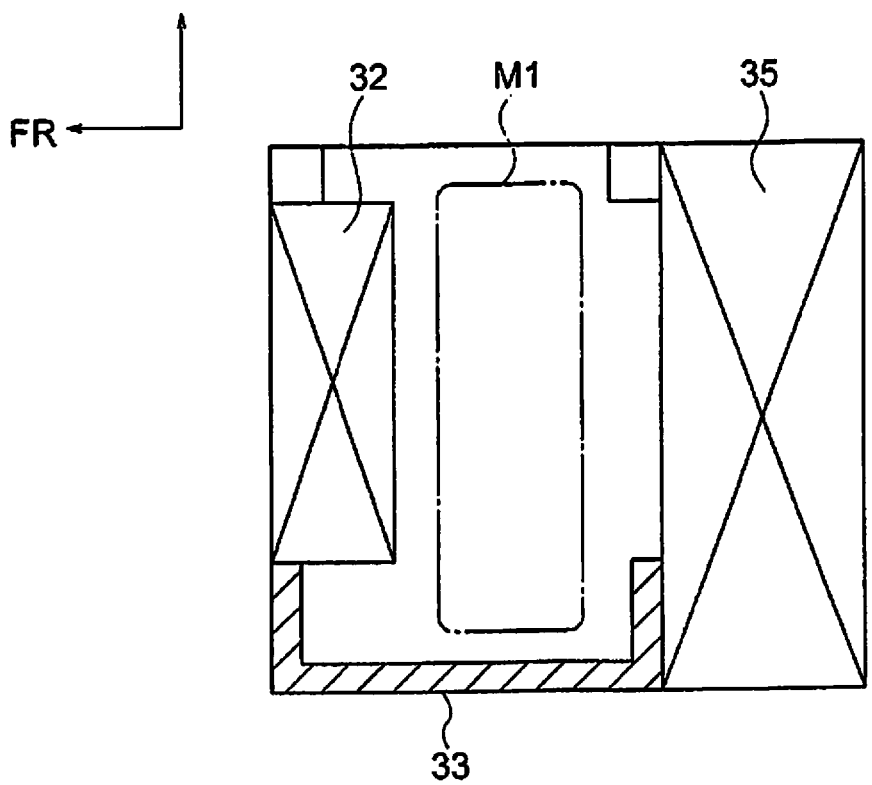
FIG. 8 is a cross-sectional view schematically illustrating the main configuration of the temperature regulation unit, and a cross-sectional view along the II-II line in FIG. 7.

The temperature regulation unit 3 is configured comprising, from the upstream side of the air flow direction, an evaporator 32 (cooling heat exchanger), a condensed water reservoir 33, an air flow path unit 34 comprising the condensed water reservoir 33, a blower fan 35 (air blowing means or device), and a PTC heater 36 (heater) inside a unit case 31, as illustrated in FIG. 6 thru FIG. 8. This temperature regulation unit 3 is disposed in a position on the side close to the air conditioner compressor 103 which is disposed in the motor room 101 in the front of the vehicle, of the internal space of the battery pack case 1 which is disposed in an underfloor space in substantially the center of the vehicle longitudinal direction.

An unit duct 37 is connected to a discharge port of the unit case 31. This unit duct 37 is configured to have a shape that is curved from a vehicle width direction to a vehicle forward direction, then curved from this vehicle forward direction to a vehicle rearward direction, as illustrated in FIG. 6, and comprises an air distribution opening 37a to which the air distribution duct 9 is connected, in an end position facing the central passage 38a in the vehicle longitudinal direction. The air flow path unit 34 is configured comprising the unit case 31 and the unit duct 37.

The evaporator 32 cools the air that passes through. That is, the evaporator 32 carries out heat exchange using the refrigerant of the air conditioner unit 107 (cabin interior air conditioner), to remove the heat from the air that passes through and to create cold air. The refrigerant from the air conditioner unit 107 is introduced into the evaporator 32 via a refrigerant tube connector terminal 13 which is attached to the front edge of the frame. Examples of the refrigerant that can be used include a type of gas, or, a long life coolant (LLC, high-performance antifreeze), etc. In addition, this evaporator 32 is arranged in a position that is more forward in the vehicle than the blower fan 35, and one of the core surfaces 32a thereof is arranged so as to be substantially parallel to and facing the frame inner side surface 11a in the front of the vehicle, as illustrated in FIG. 7.

The condensed water reservoir 33 stores the condensed water that is generated in the evaporator 32, and is arranged inside the unit case 31 as the air flow path unit 34. This condensed water reservoir 33 is disposed between the evaporator 32 and the blower fan 35 (air blowing means or device), as illustrated in FIG. 8.

The blower fan 35 is for circulating the gas inside the pack case, and comprises a waterproof structure for isolating the blower motor from water. This blower fan 35 is arranged so that the suction side 35a (suction side) thereof and the other core surface 32b of the evaporator 32 will be substantially parallel and facing each other, as illustrated in FIG. 7. In addition, the blower fan 35 blows the air in the vicinity of the evaporator 32 and the condensed water reservoir 33 (M1 region) to the vicinity of the vent 17 through the unit case 31. That is, the blow fan blows the air in the vicinity of the evaporator 32 and the condensed water reservoir 33 (M1 region) to an air outlet 99 that is provided to the air distribution duct 9 described below.

The PTC heater 36 uses a ceramic element (PTC element) called PTC thermistor (Positive Temperature Coefficient Thermistor) and is heated when an electric current is flowed through the PTC element, provides heat to the air that passes through, and creates warm air. For example, a fin-type PTC heater equipped with a heat radiating fin for increasing the heating value of the PTC element is used as the PTC heater 36.

Figure 9:
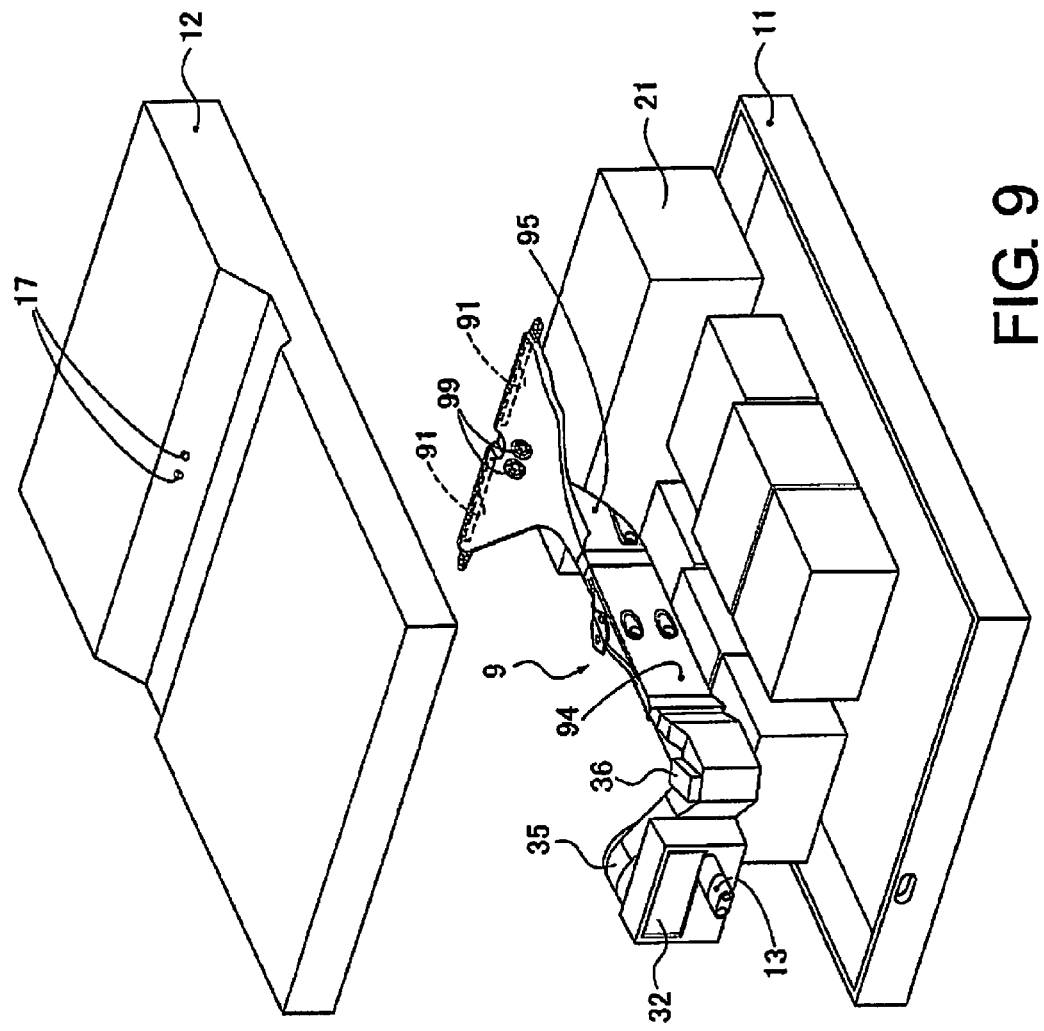
FIG. 9 is an exploded perspective view illustrating the main configuration of a battery pack BP that employs the battery temperature regulating device of the first embodiment, and a perspective view illustrating the configuration of the air distribution duct.
Figure 10:
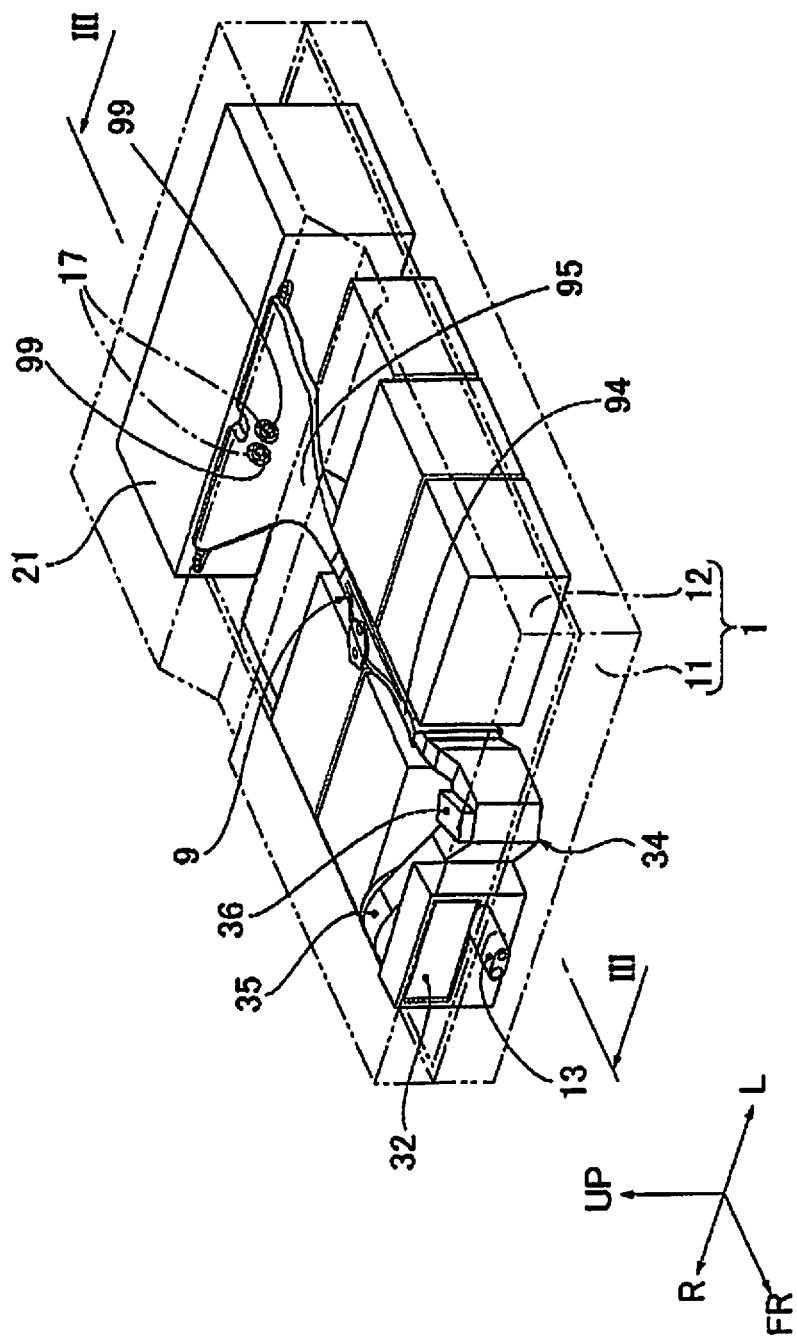
FIG. 10 is a perspective view combining the main configuration of the battery pack BP in FIG. 9, and a perspective view illustrating the positional relationship between the vent and the air outlet.

One end of the air distribution duct 9 is connected to the air distribution opening 37a of the unit duct 37, and a blowout opening 91 for blowing out conditioned air toward the rear of the vehicle is formed at the other end thereof, via a constant width duct portion 94 and a widening duct portion 95 which are arranged in a T-shaped clearance space area (the central passage 38a and the transverse passage 38b that intersects the central passage 38a in the vehicle width direction) configured by the first to the third battery stacks 21, 22, 23, as illustrated in FIG. 5 and FIG. 9. This air distribution duct 9 is disposed along the long side direction of the central portion of the battery pack lower frame 11, which is configured as a substantially rectangular shape in top view, in the vehicle longitudinal direction, as illustrated in FIG. 5. Additionally, this air distribution duct 9 extends at least to the vicinity of the vent 17. The other end of the air distribution duct 9 extends further to the rear of the vehicle than the vent 17, as illustrated in FIG. 10.

The blowout openings 91 are arranged opposing each other extending in the vehicle width direction, along the upper front area of the stack 21a (refer to FIG. 4) of the first battery stack 21, which protrudes further upward in the vehicle than the upper surface of the second and third battery stacks 22, 23.

The constant width duct portion 94 is connected to the air distribution opening 37a of the unit duct 37, the dimension in the vehicle width direction has a constant longitudinally long sectional shape, and extends in the vehicle longitudinal direction, as illustrated in FIG. 9. A space configured by the central passage 38a of the T-shaped clearance space area having a shape that is analogous to the cross-sectional shape of the duct is utilized for the arrangement of this constant width duct portion 94. That is, the constant width duct portion 94 is arranged between the second and third battery stacks 22, 23.

The widening duct portion 95 is connected to the constant width duct portion 94, and is formed by gradually reducing the vehicle vertical dimension while gradually increasing the vehicle width direction dimension toward the rear of the vehicle, as illustrated in FIG. 9. The central passage 38*a* in the T-shaped clearance space area, a clearance space that is formed above the rear side battery stack parts 22*c*, 23*c*, with a height dimension that is lower than the front side battery stack parts 22*a*, 22*b* by one module, and an upper space of the transverse passage 38*b* in the T-shaped clearance space area, are utilized for the arrangement of this widening duct portion 95.

An air outlet 99 for blowing out the air in the vicinity of the evaporator 32 and the condensed water reservoir 33 (M1 region), which is blown by the blower fan 35, toward the vent 17, is provided to the air distribution duct 9, as illustrated in FIG. 9.

The air outlet 99 is disposed in the central portion of the widening duct portion 95 in the vehicle width direction, as illustrated in FIG. 9 and FIG. 10. This air outlet 99 is arranged in a position that opposes the vent 17, and the number provided is two, which is the same as the vent 17.

Control System Configuration

The control system configuration of an electric vehicle will be described.

The control system in the first embodiment comprises an integrated controller 120 having a function to appropriately manage the energy consumption of the entire vehicle, as illustrated in FIG. 1. A vehicle mounted air conditioning system and an SOC sensor for detecting the charging state of the battery, etc. are provided as a control means (or device) that are connected to this integrated controller 120 via a bidirectional communication line such as a CAN cable. In addition, a junction box 5, a temperature regulation relay 51 and a temperature regulation controller 52 (battery temperature regulating means or device) which are installed together in the junction box 5, and an LB controller 6, etc., are provided as control means (or device) that are connected to this integrated controller 120 via a weak current harness that transmits various information, so as to be capable of bidirectional communication.

The integrated controller 120 carries out various controls, based on input information from each of the control devices, the ignition switch, the accelerator position opening amount sensor, the vehicle speed sensor, the vehicle mounted air conditioning system, the SOC sensor, the junction box 5, the LB controller 6, and the like.

Of the above, a battery temperature adjustment control for adjusting the battery temperature of the battery pack BP to the optimum temperature range. In addition, a condensed water discharge control for discharging the condensed water that is generated in the evaporator 32 during an execution of battery cooling for cooling the battery stack 2 which uses the evaporator 32 after the execution of the battery cooling. The evaporator 32 and the PTC heater 36 are not operated during this condensed water discharge control.

That is, in both controls of the battery temperature adjustment control and the condensed water discharge control, a signal is transmitted from the integrated controller 120 to the temperature regulation relay 51 and the temperature regulation controller 52, which control the temperature regulation unit 3 based on various input information to the integrated controller 120. Additionally, a signal is transmitted from the integrated controller 120 to the vehicle mounted air conditioning system during battery cooling. The "battery temperature adjustment control" and the "condensed water discharge control" are described separately below.

Battery Temperature Adjustment Control

The battery temperature information, which is the temperature of the battery module (battery temperature) detected by the temperature sensor T is transmitted from the LB controller 6, etc., to the integrated controller 120. The integrated controller 120 transmits an appropriate signal to each control devices, based on the battery temperature information, and the like.

When executing cooling of the battery stack 2 (battery cooling), the integrated controller 120 transmits a signal to the vehicle mounted air conditioning system for introducing the refrigerant of the air conditioner unit 107 to the evaporator 32. The vehicle mounted air conditioning system introduces the refrigerant of the air conditioner unit 107 to the evaporator 32 based on this signal. Additionally, at this time, the integrated controller 120 outputs a drive signal for driving the blower fan 35 to the temperature regulation relay 51 and the temperature regulation controller 52. The temperature regulation controller 52 drives the blower fan 35 based on this drive signal. This battery cooling is executed only when charging the battery stack 2.

Here, "when charging the battery stack 2" is the time when the battery stack 2 is connected to the charging station 118.

When executing battery heating (heating of the battery stack 2) for heating the battery stack 2 using the PTC heater 36, the integrated controller 120 outputs a drive signal for driving the blower fan 35 and the PTC heater 36 to the temperature regulation relay 51 and the temperature regulation controller 52. The temperature regulation controller 52 drives the blower fan 35 and the PTC heater 36 based on this drive signal.

Condensed Water Discharge Control

In the case of condensed water discharge control, the integrated controller 120 outputs a drive signal for driving the blower fan 35 to the temperature regulation relay 51 and the temperature regulation controller 52 after executing battery cooling. This drive signal includes at least the rotation rate of the blower fan 35 (drive output, blower fan rotation rate (%)), and the drive time of the blower fan 35 as the air blowing device (hereinafter also simply referred to as "drive time."). The temperature regulation controller 52 drives the blower fan 35 during the drive time, based on this drive signal. When this blower fan rotation rate (hereinafter also simply referred to as "rotation rate") is 0%, the blower fan 35 is stopped, and when at 100%, the blower fan 35 becomes the maximum rotation. In addition, the rotation rate of the blower fan 35 is set lower for the rotation rate during the "condensed water discharge control" than the rotation rate during the "battery temperature adjustment control."

Here, "drive time (predetermined drive time)" is a drive time during which the blower fan 35 is driven when battery cooling is not executed, that is, when the evaporator 32 is not used, and is a drive time with which the maximum amount of condensed water that is generated when executing battery cooling can be discharged (dried). For example, the drive time is 25 minutes. This time is determined in the integrated controller 120 from the generated amount of condensed water. This generated amount of condensed water is determined from the air volume of the battery pack case 1, the frequency of use (for example, time) of the battery stack 2 for cooling (battery cooling), and the representative environment temperature and humidity. The representative environment temperature and humidity are determined from, for example, the external environment temperature and humidity obtained from an outside temperature sensor, etc., which is commonly disposed on an electric vehicle, from battery temperature information, etc., that is transmitted from the LB controller 6 to the integrated controller 120, or the like.

Next, the actions are described.

The "battery temperature adjustment action of the battery pack BP," the "basic action of the condensed water discharge control," the "operation during vehicle charging," the "condensed water discharge control action during vehicle startup," the "condensed water discharge control action during vehicle restart," the "condensed water discharge control action during battery cooling," and the "condensed water discharge control action during battery heating" will be separately described regarding the actions in the battery temperature regulating device of the first embodiment.

Battery Temperature Adjustment Action of the Battery Pack BP

Batteries are highly dependent on temperature, and the battery performance is reduced both when the battery temperature is too high and when the battery temperature is too low. Therefore, adjusting the battery temperature to the optimum temperature range is preferable in order to maintain a high battery performance during low outside temperature or high outside temperature. The battery temperature adjustment action of the battery pack BP which reflects the above will be described below, based on FIG. 5 and FIG. 7.

For example, when the internal temperature of the battery pack BP (temperature detected by the temperature sensor T) becomes higher than a first set temperature (predetermined temperature) by being influenced by a continuation of battery charge/discharge load or a high outside temperature, refrigerant is introduced to the evaporator 32 of the temperature regulation unit 3 (the evaporator 32 is driven) and the blower fan 35 is turned. Accordingly, heat is removed from air that passes through the evaporator 32 creating cold air, as illustrated in FIG. 7. The internal temperature of the battery pack BP (battery temperature) is reduced by circulating this cold air in the internal space of the case in which are mounted the first battery stack 21, the second battery stack 22, and the third battery stack 23, via the air distribution duct 9.

In contrast, for example, when the internal temperature of the battery pack BP becomes lower than a second set temperature by being influenced by cold air circulation or a low outside temperature, the PTC heater 36 of the temperature regulation unit 3 is energized to turn the blower fan 35. Accordingly, heat is applied to the air that passes through the PTC heater 36 creating warm air, as illustrated in FIG. 7. The internal temperature of the battery pack BP (battery temperature) is increased by circulating this warm air in the internal space of the case in which are mounted the first battery stack 21, the second battery stack 22, and the third battery stack 23, via the air distribution duct 9.

The internal temperature of the battery pack BP can be maintained at a temperature within the range from the first set temperature to the second set temperature, in which a high battery performance can be obtained, by carrying out a conditioning control of the battery pack BP in this manner. At this time, carrying out circulation while blowing out conditioned air is important, so that the temperature distribution between the first battery stack 21, the second battery stack 22, and the third battery stack 23 will be uniform. Conditioned air is circulated as indicated by the "Air Flow" arrow in FIG. 5.

Basic Action of the Condensed Water Discharge Control

For example, a cooling device of a vehicle mounted battery, to which are provided a reservoir for storing dew condensation water (condensed water), and an opening/closing mechanism comprising a plug member for discharging the dew condensation water that is accumulated in the reservoir to the outside, shall be the comparative example. The cooling device of a vehicle mounted battery of this comparative example is configured to prevent the entry of water into the battery case while successfully discharging the dew condensation water (condensed water), which is generated when cooling the battery, to the outside.

However, if an opening/closing mechanism is provided to a cooling unit, a part for opening/closing such as a plug member becomes necessary; therefore, the layout space is increased.

Since a part for opening/closing such as a plug member becomes necessary in this manner, there was the problem that the layout space is increased.

In contrast, in the first embodiment, a configuration was employed in which the battery pack case 1 comprises a vent 17, and the blower fan 35 is driven by the temperature regulation controller 52 regardless of the temperature of the battery module which is detected by the temperature sensor T, at a predetermined timing after the execution of battery cooling is completed.

That is, in the battery temperature regulating device, condensed water is generated in the evaporator 32 by executing battery cooling, and this condensed water is stored in the condensed water reservoir 33 after executing the battery cooling, which evaporates according to the water vapor partial pressure difference with the surrounding air (air in the vicinity of the evaporator 32 and the condensed water reservoir 33 (water vapor of the condensed water)).

At this time, if the blower fan 35 is not driven, the water vapor (water vapor of the condensed water) partial pressure in the vicinity of the evaporator 32 and the condensed water reservoir 33 is increased due to evaporation of the condensed water. Due to this rise, the gradient of the water vapor partial pressure in the battery pack case 1 from the vicinity of the evaporator 32 and the condensed water reservoir 33 to the vent 17 becomes a distribution in which the water vapor partial pressure in the vicinity of the evaporator 32 and the condensed water reservoir 33 is high and the water vapor partial pressure in the vicinity of the vent 17 is low. According, a state is continued in which the water vapor partial pressure in the vicinity of the vent 17 is low; therefore, the condensed water which has become water vapor is discharged from the vent 17 to the outside of the battery pack case 1, due to a volume expansion inside the battery pack case 1 caused by the evaporation of the condensed water.

On the other hand, in the first embodiment, since only the blower fan 35 is driven without carrying out cooling by the evaporator 32 (without driving the evaporator 32) during this evaporation of condensed water at a predetermined timing, the inside of the battery pack case 1 enters a forced convection state (circulation state), and the water vapor (air) that is locally generated in the vicinity of the evaporator 32 and the condensed water reservoir 33 is diffused into the battery pack case 1. Accordingly, the gradient of the water vapor partial pressure in the battery pack case 1 becomes gentle from the vicinity of the evaporator 32 and the condensed water reservoir 33 to the vent 17, and the water vapor partial pressure in the vicinity of the vent 17 becomes greater than the water vapor partial pressure in the vicinity of the vent 17 when the blower fan 35 is not driven.

Therefore, discharging of the condensed water that has become water vapor from the vent 17 to the outside of the battery pack case 1 can be carried out efficiently.

As a result, discharging of the condensed water to the outside of the battery pack case 1 without increasing the layout space becomes possible, by not adding additional drive parts or the like.

Figure 11:
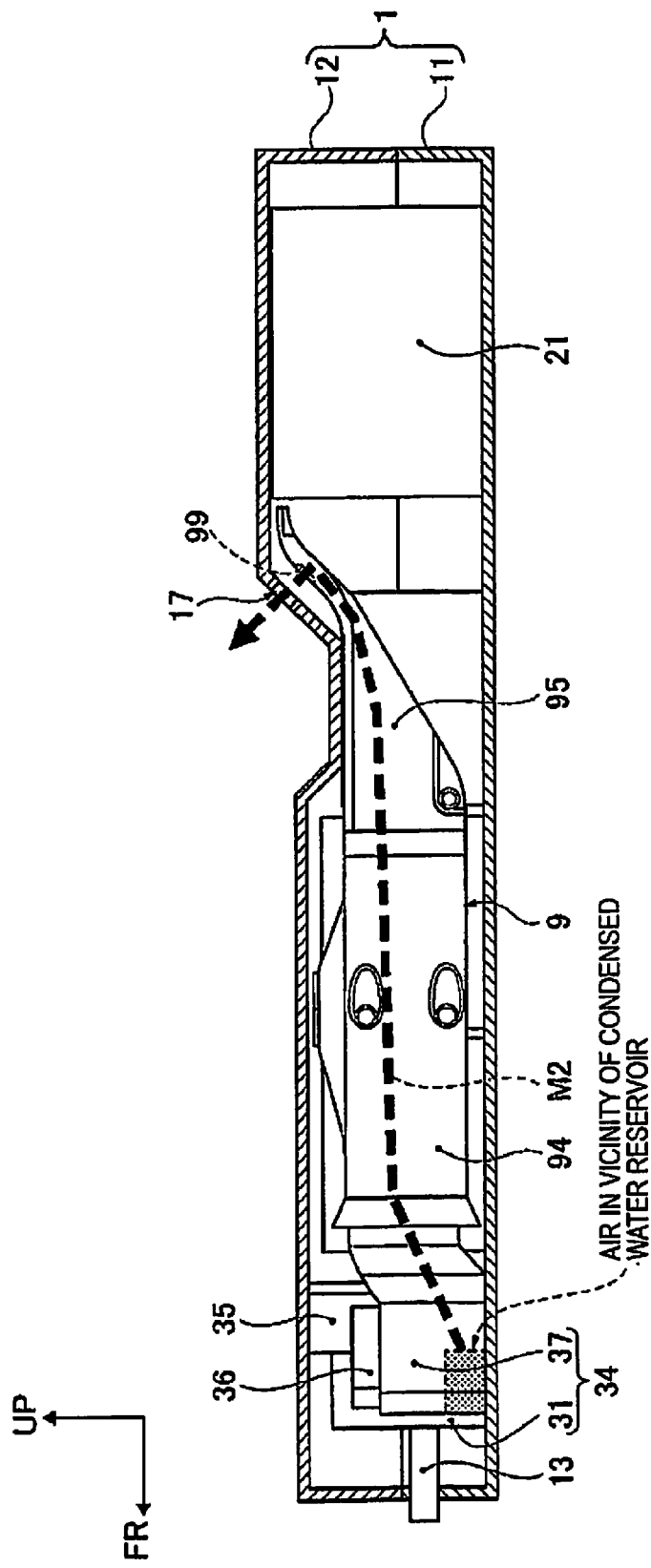
FIG. 11 is a cross-sectional view illustrating the battery pack BP of the first embodiment, and a cross-sectional view along the III-III line in FIG. 10.

In addition, since an air distribution duct 9 and an air outlet 99 are provided, the air in the vicinity of the evaporator 32 and the condensed water reservoir 33, which is blown by the driving of the blower fan 35, is blown out from the air outlet 99 toward the vent 17 through the air distribution duct 9 (arrow M2), as illustrated in FIG. 11. In the first embodiment, more air in the vicinity of the evaporator 32 and the condensed water reservoir 33 is thereby blown to the vent 17, compared to a case in which an air outlet 99 and an air distribution duct 9, which extends to the vicinity of the vent 17, are not provided. Accordingly, in the first embodiment, increasing the air in the vicinity of the evaporator 32 and the condensed water reservoir 33, that is, the amount of water of the condensed water that has become water vapor, that is discharged from the vent 17 can be increased, compared to a case in which an air outlet 99 and an air distribution duct 9 are not provided. As a result, improving the discharge reliability of condensed water becomes possible. Moreover, when executing battery cooling, entry of air, i.e., water, from outside of the battery pack case 1 is suppressed by the circulation air, i.e., the dynamic pressure hitting the vent 17; therefore, the generation amount of condensed water in the battery pack case 1 can be reduced.

In addition, the rotation rate of the blower fan 35 during the condensed water discharge control needs only to be a rotation rate with which discharging of the condensed water which has become water vapor described above is possible. That is, the rotation rate of the blower fan 35 needs only to be a rotation rate with which raising the evaporation rate of the condensed water is possible. Accordingly, since the rotation rate of the blower fan 35 can be reduced to the minimum required rotation rate, suppressing noise, vibration, and power consumption by the blower fan 35 becomes possible. Moreover, the total rotation rate of the blower fan 35 while the vehicle is running can be suppressed to extend the longevity of the blower fan 35, by reducing the blower fan rotation rate in such a manner.

By battery cooling being executed only during charging of the battery stack 2, the time that inside of the battery pack case 1 is dehumidified and the timing (timing) of the dehumidification is defined; therefore, the generated amount of condensed water is limited. Accordingly, the space of a portion of the temperature regulation unit 3 can be reduced by optimizing the size of the condensed water reservoir 33 (volume, etc.) according to the generated amount of condensed water. Moreover, battery cooling is not executed (the evaporator 32 is not driven) while the vehicle is running. That is, battery cooling is executed during charging of the battery stack 2, when the battery stack 2 is connected to the charging station 118. Accordingly, battery cooling can be carried out using the power that is supplied from the charging station 118. Accordingly, the power amounting thereto (amounting to battery cooling) will not be consumed, and the travel distance of the vehicle can be extended. Therefore, the battery stack 2 can be controlled to an optimum temperature without reducing the cruisable distance of the vehicle.

Operation During Vehicle Charging

Figure 14:
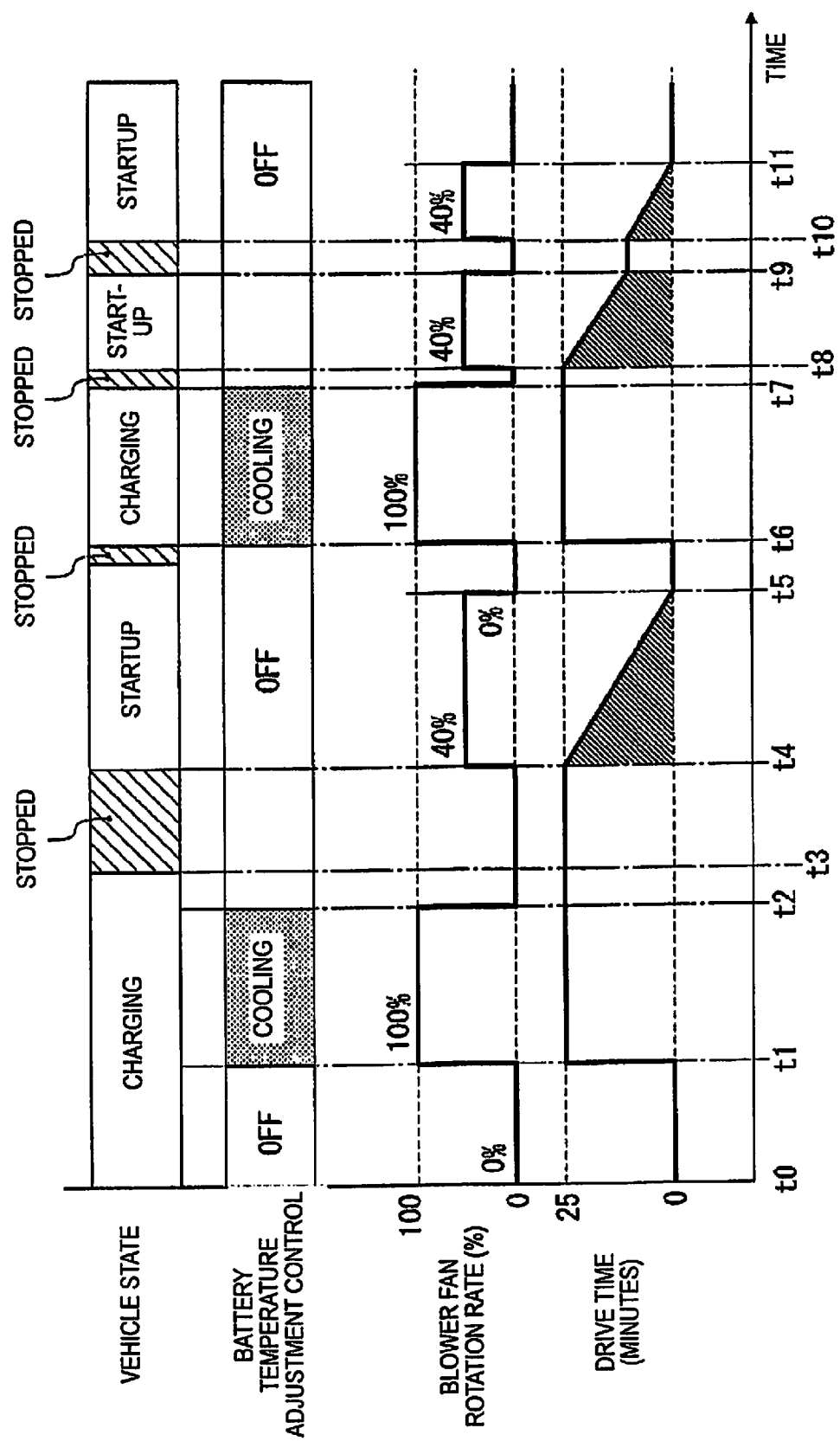
FIG. 14 is a time chart illustrating the operation in each of the controls of the condensed water discharge control during vehicle startup, and the condensed water discharge control during vehicle restart.

The "operation during vehicle charging" will be described in detail below, based on the operational flowchart in FIG. 12 and the time chart of each operation in FIG. 14. The vertical axis in FIG. 14 shows, in order from the top, the vehicle state (start/stop/charge state), the battery temperature adjustment control (cooling/heating/OFF (state that does nothing)), the blower fan rotation rate (%), and the drive time (minutes). The horizontal axis in FIG. 14 represents time, and "t" represents the time.

The battery charge start of the battery stack 2 is determined in step S10 (time t0). Regarding this start of battery charge, battery charge start is determined, for example, by detecting that a charging gun of the charging station (external power source) has been connected (inserted) to the charging port 115. Alternatively, charge start can be determined by detecting that power supply from the charger has been started; however, in the present embodiment, battery charge start is determined by detecting that a charging gun has been connected to the charging port 115. That is, the flowchart of FIG. 12 is started when battery charge start has been determined, and the steps proceed to step S11. At this time (time t0), the battery temperature adjustment control and the blower fan 35 are not being operated. In addition, the drive time of the blower fan (air blowing device) is 0 minutes.

The internal temperature of the battery pack BP (battery temperature) and a first set temperature which is set in advance are compared, and whether or not the internal temperature of the battery pack BP has been increased by the battery charge and has become higher than the first set temperature is determined in step S11 (time t'. If the internal temperature of the battery pack BP has become higher than the first set temperature, the steps proceed to step S12, and if the internal temperature of the battery pack BP is equal to or less than the first set temperature, the steps proceed to step S111 to carry out a determination on whether or not battery charge has been completed. If the charging of the battery is determined to have been completed in step S111, the present flow is ended; if not (that is, if battery charging is determined to be in progress), the steps return to step S11, and a comparison between the internal temperature of the battery pack BP and the first set temperature is carried out again. The completion of battery charge can be determined by detecting that the charging gun 119 of the charging station 118 has been disconnected (withdrawn) from the charging port 115, or, that power supply from the charging station 118 has been stopped; in the present embodiment, the completion of battery charge shall be determined by detecting that the charging gun 119 of the charging station 118 has been disconnected from the charging port 115.

Battery cooling is started (executed) in order to reduce the internal temperature of the battery pack BP in step S12 (time t1), following an increase in the battery temperature in step S11. That is, refrigerant is introduced into the evaporator 32 of the temperature regulation unit 3, and the blower fan 35 is driven at a rotation rate of 100%.

Since condensed water is generated by the battery cooling in step S12, the drive time is set to a predetermined time (for example 25 minutes), which is set in advance, in order to carry out a condensed water discharge control after executing the battery cooling, and stored (overwriting the memory) in step S13 (time t1). For example, the drive time is stored in the integrated controller 120. Even in a case in which another drive time is already set, the time is reset, and the drive time is set to a predetermined time (for example 25 minutes), which is set in advance.

Whether or not battery charge has been completed is determined in step S14, in the same way as step S111. That is, whether or not the charging gun 119 of the charging station 118 is disconnected (withdrawn) from the charging port 115 is determined. In the case that battery charge is completed, the steps proceed to step S15; if not, the steps proceed to step S141.

Whether or not the battery temperature has been decreased by the battery cooling to equal to or less than a second set temperature, which is lower than the first set temperature set in advance, is determined in step S141. If the battery temperature has been decreased to equal to or less than the second set temperature, the steps proceed to step S15 and battery cooling is ended (time t2). Since the battery cooling operation started in step S12 is stopped at this time, the rotation rate is set from 100% to 0%, and the blower fan 35 is stopped. On the other hand, if the battery temperature is higher than the second set temperature, the steps return to step S14 again, and battery cooling is continued.

Whether or not battery charge has been completed is determined in step S16, in the same way as step S14. That is, whether or not the charging gun 119 of the charging station 118 is disconnected (withdrawn) from the charging port 115 is determined. If the battery charge is completed (time t3), the vehicle transitions to a stopped state (shutdown state, i.e., an ignition-off state) in a state in which the drive time is set to a predetermined time (25 minutes) (in a state in which the drive time is stored and held), and the present control flow is ended. On the other hand, if the battery charge is not completed (that is, if the steps have proceeded to step S16 via NO in step S14→YES in step S141→step S15), the steps return to step S11, and charging is continued.

Condensed Water Discharge Control Action During Vehicle Startup

Figure 13:
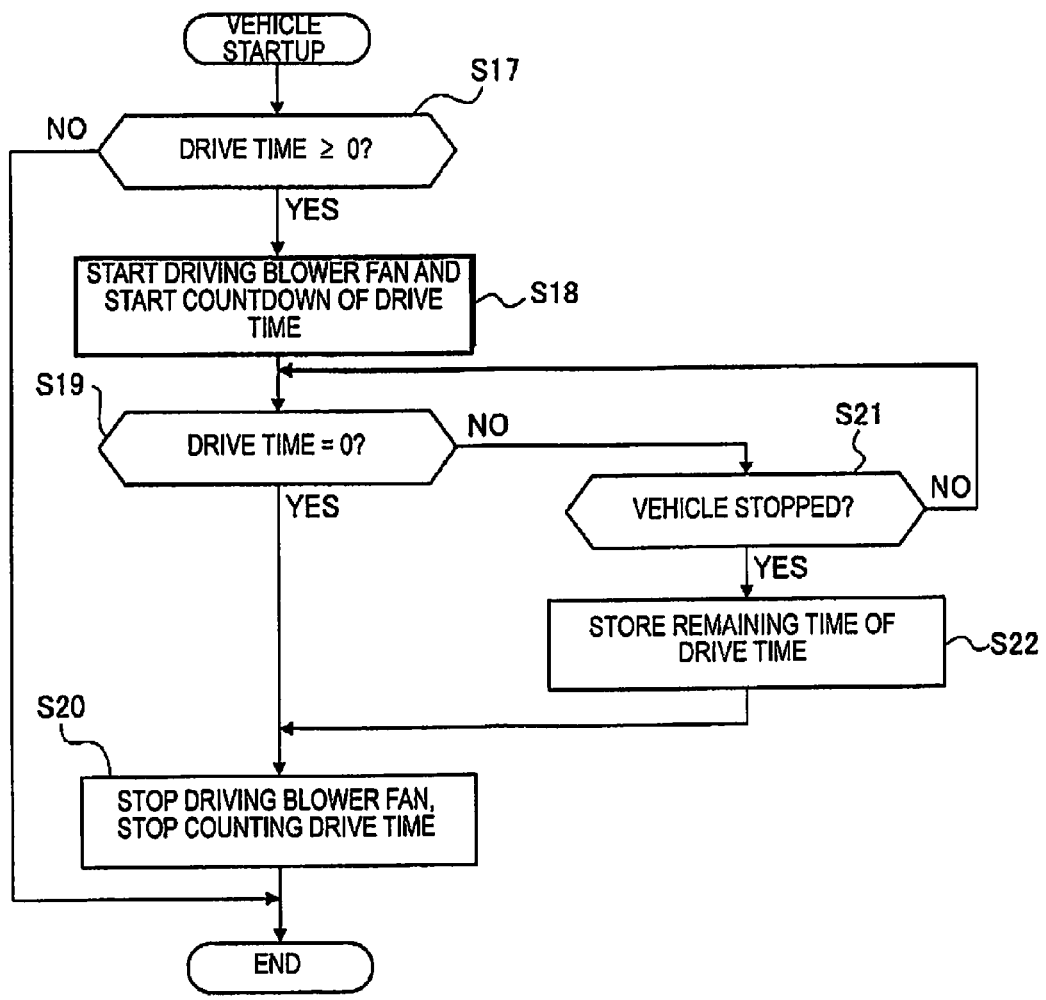
FIG. 13 is an operational flowchart illustrating the flow of the condensed water discharge control steps during vehicle startup/restart.

The "condensed water discharge control action during vehicle startup" will be described in detail below, based on the operational flowchart in FIG. 13 and the time chart of each operation in FIG. 14. The flowchart of FIG. 13 is started when the vehicle is started from a stopped state (times t4, t8) by the ignition being turned ON. Below, the "operation during vehicle startup at time t4" is first described, and the "operation during vehicle startup at time t8 (described in "condensed water discharge control action during vehicle restart" described below)" will be described separately. Times t4, t8 correspond to the predetermined timing after battery cooling, which is the time of the next vehicle startup.

First, the operation during vehicle startup at time t4 will be described. Whether or not the drive time is greater than 0, that is, whether or not a drive time has been set, is determined in step S17. If the drive time has been set, the steps proceed to step S18; if not set, the control is ended. A countdown of the drive time is started in step S18 (time t4). At this time, the blower fan 35 is driven at a rotation rate of 40%. The drive time is counted down from time t4 to time t5 by subtracting the elapsed time from the drive time stored in step S13 or in step S22 described below, as illustrated in FIG. 14. The blower fan 35 which is driven during this drive time is driven by a 12V battery. Power from the battery pack BP (high power battery) is supplied to this 12V battery during vehicle startup via a DC/DC converter.

Whether or not the drive time, which is started to be counted down in step S18 (time t4), has reached 0 minutes is determined, in step S19. That is, whether or not the elapsed time (count time), from the point in time at which the driving of the blower fan 35 is started in step S18, has become equal to or greater than the stored drive time is determined. If the countdown of the drive time has reached 0 minutes (time t5), the steps proceed to step S20, the rotation rate of the blower fan 35 is set from 40% to 0% to stop the blower fan 35, and the countdown of the drive time is stopped. On the other hand, if the countdown of the drive time has not reached 0 minutes, the steps proceed to step S21.

Whether or not the vehicle has stopped by the ignition being turned OFF is determined in step S21; if the vehicle is determined to have stopped, the steps proceed to step S22 and the remaining time of the drive time, which is subtracted with the passage of time from the start of countdown, is stored; then, the steps proceed to step S20, the blower fan 35 is stopped, the countdown of the drive time is also stopped, and the steps are ended. On the other hand, if the vehicle is determined to have not stopped, the steps proceed to step S19, and the countdown is continued until the drive time becomes zero.

The operation from step S17 to step S20 corresponds to the "condensed water discharge control during vehicle startup."

Of the operations above, the battery stack 2 is energized from step S15 (time t2) until the point in time at which charge end is determined in step S16 (time t3), as well as from the point in time at which startup of the vehicle is determined in step S17 (time t4) and during vehicle startup; therefore, the air temperature in the battery pack BP is increased. Due to this temperature rise, the internal pressure of the battery pack BP is increased relatively, compared to this external pressure. Accordingly, since a pressure difference is generated between the external pressure and the internal pressure of the battery pack BP, the condensed water which has become water vapor becomes easy to discharge. In addition, evaporation of the condensed water is promoted by the temperature rise, and the amount of water of the condensed water which has become water vapor is increased.

As a result, more condensed water, which has become water vapor, can be discharged from the vent 17, and the condensed water which has become water vapor becomes even easier to discharge. In general, the power consumption for driving the blower fan 35 is extremely small compared to the driving power of the evaporator 32, and thus is a power amount that hardly affects the cruising distance.

In addition, the drive time is determined from the air volume of the battery pack case 1, the frequency of use of the battery stack 2 for cooling (battery cooling), and the representative environment temperature and humidity. Accordingly, the drive time can be determined without requiring a humidity sensor or the like being disposed in the battery pack case 1 or the temperature regulation unit 3.

As a result, the number of parts in the battery pack case 1 or the temperature regulation unit 3 can be reduced.

In addition, the blower fan 35 is driven by a 12V battery during vehicle startup. Since this 12V battery is charged by a power supply from the battery pack BP (high power battery) during vehicle startup, the 12V battery will not die. Accordingly, a dedicated power source for the blower fan 35 becomes unnecessary, and the layout space will not be increased.

Condensed Water Discharge Control Action During Vehicle Restart

The "condensed water discharge control action during vehicle restart" will be described in detail below, based on the operational flowchart in FIG. 13 and the time chart of each operation in FIG. 14.

At time t6, battery cooling is carried out at the same time as starting the battery charge. This represents the fact that the battery temperature that was raised during vehicle startup has not been reduced to equal to or less than the first set temperature, from after the vehicle is stopped (shutdown state) until battery charge is started, and that the internal temperature of the battery pack BP is in a high-temperature state. The flowchart of FIG. 12 is started at time t6, accompanying the start of battery charge.

Battery charge is ended at the same as the completion of battery cooling at time t7. The possibility that battery charge was completed before the completion of battery cooling is conceivable. At this time, the predetermined time (25 minutes) set in step S13 in the flowchart of FIG. 12 is set and stored as the drive time.

Next, the operation during vehicle startup at time t8 will be described. When the vehicle is started at time t8, the flowchart of FIG. 13 is started as described above, and the drive time is determined to be greater than zero in step S17; then, the blower fan 35 is started to be driven at a rotation rate of 40%, and a countdown of the drive time is started with the predetermined time (25 minutes) set in step S13 in the flowchart of FIG. 12 as the initial value, in step S18.

At time t9, the vehicle is stopped by the ignition being turned OFF before the drive time becomes zero. That is, the vehicle is stopped by the ignition being turned OFF before (NO in step S19) the elapsed time from the point in time when the driving of the blower fan 35 is started in step S18 becomes the drive time (25 minutes), and a positive determination is made in step S21 in the flowchart of FIG. 13.

At time t9, based on the vehicle stop in step S21, the remaining time of the drive time, for which countdown is started in step S18, is stored in step S22, and the steps proceed from step S22 to step S20. That is, after storing the remaining time obtained by subtracting the time from the start of driving the blower fan 35 until ignition OFF from the drive time (25 minutes) set in S13, the rotation rate of the blower fan 35 is set from 40% to 0% to stop the blower fan 35. The remaining time of the drive time is, for example, stored in the integrated controller 120.

At time t10, the vehicle is restarted by turning the ignition ON. That is, a restarting of the vehicle with respect to a case in which the vehicle startup at time t8 is assumed as the first vehicle startup.

At time t10, the flowchart of FIG. 13 is started again, based on the vehicle restart. At this time, in the determination of step S17 in the flowchart of FIG. 13, since the remaining drive time is stored at the time of the previous ignition OFF, the drive time is determined to be a longer time than zero; then, a countdown of the remaining drive time is started in step S18, and the condensed water discharge control is carried out again. At this time, the rotation rate is set from 0% to 40% to drive the blower fan 35. Countdown of the remaining drive time is carried out between time t10 and time t11, as illustrated in FIG. 14. The blower fan 35 that is driven during the remaining drive time is also driven by a 12V battery, and this 12V battery is supplied power from the battery pack BP (high power battery) during vehicle startup.

At time t11, since the countdown of the remaining drive time reaches zero minutes, the determination of step S19 is positively determined; then, the steps proceed to step S20, and the count of the drive time is ended. At this time, the rotation rate is set from 40% to 0% to stop the blower fan 35.

Of the operations described above, at time t9, the vehicle is stopped before the completion of the count of the drive time to discharge the condensed water that is generated while executing the battery cooling. As a result, the count thereof is also stopped at time t9. Then, the remaining drive time is counted between time t10 and time t11, after the vehicle restart at time t10. That is, discharging from the air outlet 99 to the vent 17 becomes possible by driving the blower fan 35.

Accordingly, counting is intermittently carried out until the completion of the counting of the drive time, by starting and stopping the counting of the drive time according to the starting and stopping of the vehicle.

As a result, the necessary drive time with respect to the amount of condensed water corresponding to the condensed water that is generated while executing the battery cooling is secured; therefore, improving the discharge reliability of condensed water becomes possible.

Condensed Water Discharge Control Action During Battery Cooling

Figure 16:
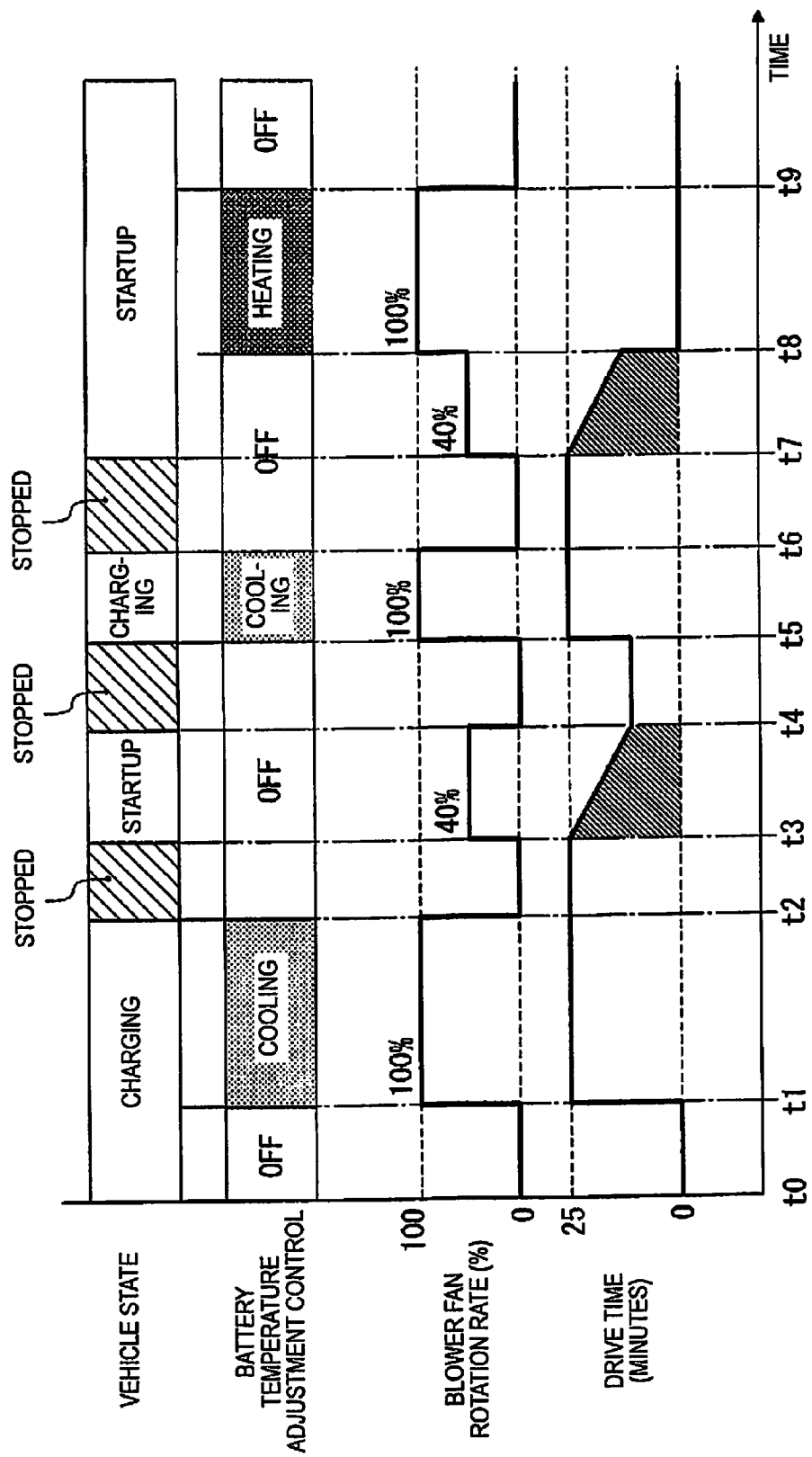
FIG. 16 is a time chart illustrating the operation in each of the controls of the condensed water discharge control during battery cooling and the condensed water discharge control during battery heating.

The "condensed water discharge control action during battery cooling" will be described in detail below, based on the operational flowcharts in FIG. 12 and FIG. 13 and the time chart of each operation in FIG. 16. The vertical axis in FIG. 16 shows, in order from the top, the vehicle state (start/stop/charge state), the battery temperature adjustment control (cooling/heating/OFF (state that does nothing)), the blower fan rotation rate (%), and the drive time (minutes). The horizontal axis in FIG. 14 represents time, and "t" represents the time.

The operation from times t0 to t5 in FIG. 16 is the same as the operation in FIG. 14, so the description thereof is omitted. Time t3 in FIG. 16 corresponds to the predetermined timing after battery cooling, which is the time of the next vehicle startup.

Figure 12:
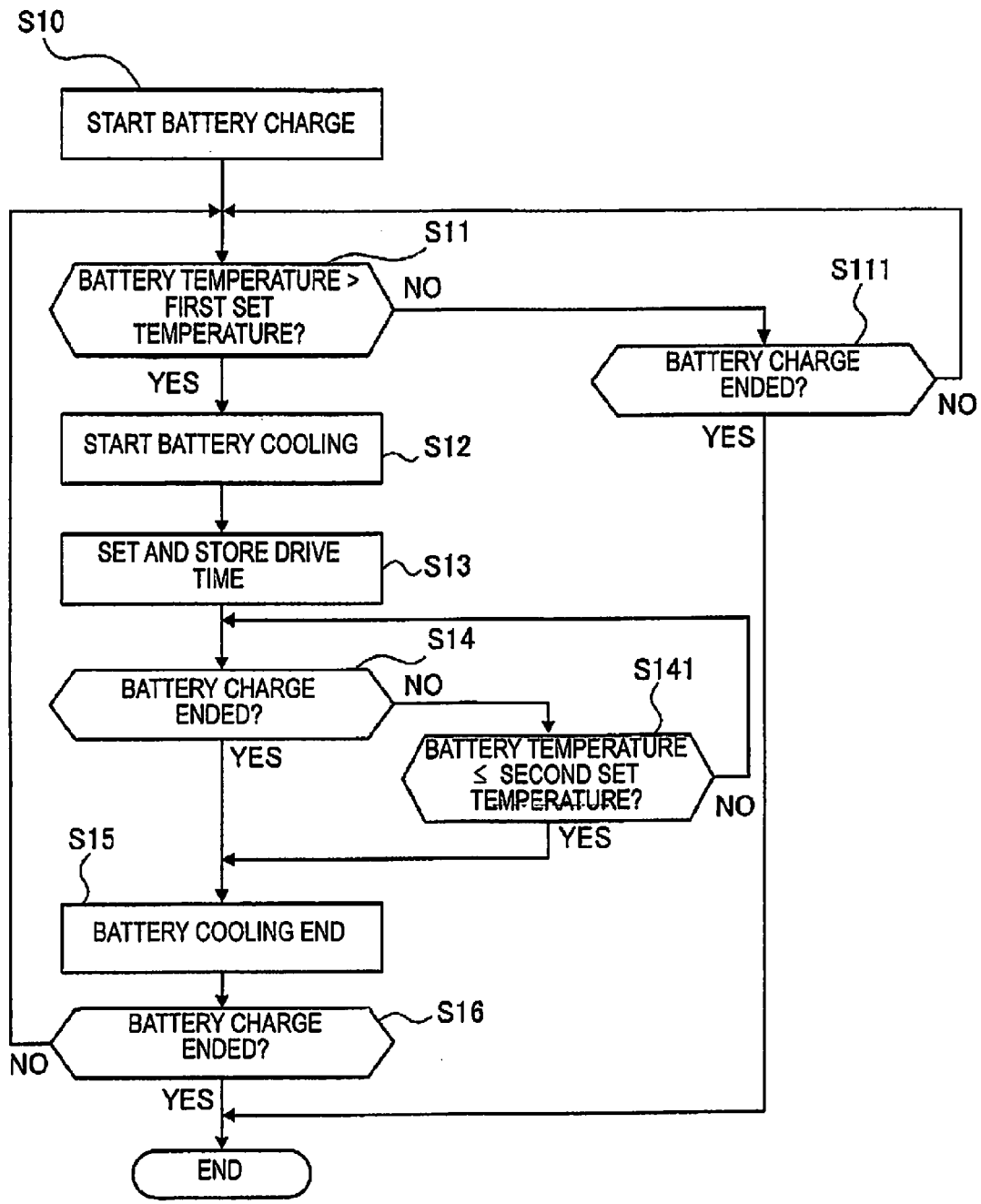
FIG. 12 is an operational flowchart illustrating the flow of the condensed water discharge control steps during vehicle charging.

The flowchart of FIG. 12 is started at time t5, accompanying the start of battery charge. At this point in time, the remaining time of the drive time that is stored at the time of the previous vehicle stop (time t4 in FIG. 16) is stored; however, since battery cooling is started at time t5, the count of the drive time in step S13 of FIG. 12 is reset, and a predetermined time (25 minutes) which is set in advance is reset (overwriting the memory) as the drive time, in order to carry out a condensed water discharge control after executing the battery cooling. Thereafter, control is carried out in accordance with the flowchart of FIG. 12 until battery charge is ended.

Of the operations described above, at time t4, the vehicle is stopped before the completion of the countdown of the drive time to discharge the condensed water that is generated while executing the battery cooling. As a result, the remaining time of the drive time at that point in time is stored, at time t4. Then, between time t4 and time t7, that is, after vehicle stop and before vehicle restart, condensed water is newly generated by battery cooling being executed in the period from time t5 to time t6.

In contrast, at time t5, the stored remaining time of the drive time is reset, and the drive time is set again to the predetermined time (25 minutes). This reset drive time is a drive time with which the maximum amount of condensed water that is generated when executing battery cooling can be discharged.

Accordingly, in the vehicle startup at time t7, the flowchart of FIG. 13 is started and the countdown of the drive time after resetting is started; then, by this time after the reset being completed, not only the remaining condensed water from before the counting of the drive time is ended, but also the additional condensed water that is newly generated, can be discharged from the air outlet 99 to the vent 17. This time t7 corresponds to the predetermined timing after battery cooling, which is the time of the next vehicle startup.

As a result, the necessary drive time with respect to the additional condensed water that is newly generated is secured; therefore, improving the discharge reliability of condensed water becomes possible.

Condensed Water Discharge Control Action During Battery Heating

If the outside air temperature is low at the time of vehicle startup, there is the possibility that the temperature of the battery is excessively reduced. Therefore, it is preferable to provide a function to heat the battery as a temperature adjustment mechanism of the battery. The "condensed water discharge control action during battery heating" in the case of providing a heating mechanism of the battery will be described in detail below, based on the operational flowchart in FIG. 15 and the time chart of each operation in FIG. 16.

Figure 15:
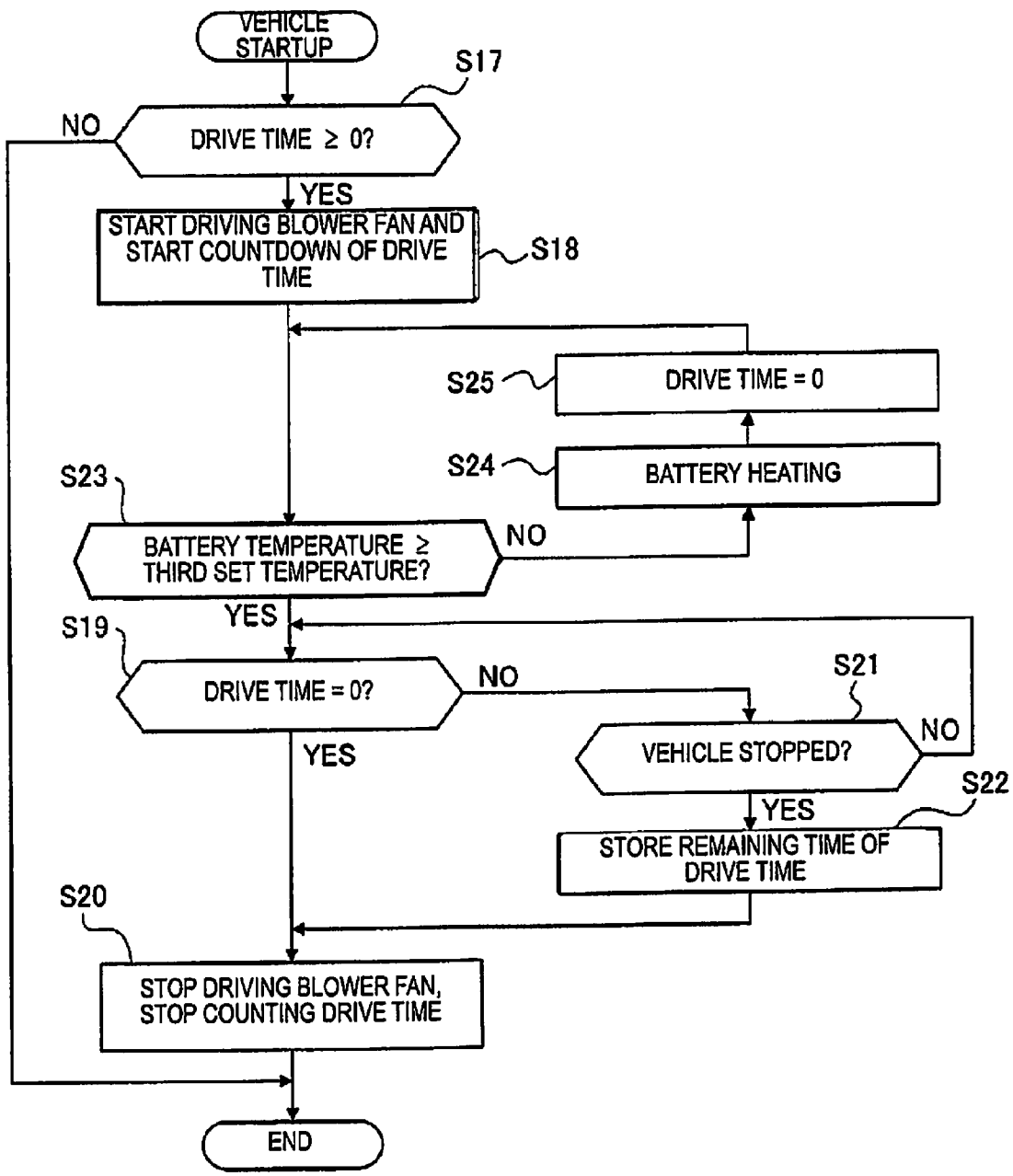
FIG. 15 is an operational flowchart illustrating the flow of each step of the condensed water discharge control during battery cooling, and the condensed water discharge control during battery heating.

Step S17 to step S22 in FIG. 15 is the same as step S17 to step S22 in FIG. 13; therefore, the same codes are provided to the corresponding step S, and the description thereof will be omitted. In addition, the flowchart of FIG. 15 is started when the vehicle is started from a stopped state by the ignition being turned ON, in the same way as the flowchart of FIG. 13.

In step S23, for example, whether or not the internal temperature of the battery pack BP has been reduced and has become equal to or greater than a third set temperature, which is set in advance and is lower than the second set temperature, by being influenced by cold air circulation or the low outside air temperature, is determined. Here, the third set temperature is a low temperature at which the increase in the internal resistance caused by a decrease in the battery pack BP temperature becomes extremely large, and the performance of the battery pack BP (input/output power) becomes lower than the performance designed to be required, for example, a temperature of about 0° C. If the battery pack BP temperature in step S23 is equal to or greater than the third set temperature, heating is determined to be not required, and the steps proceed to step S19. On the other hand, if the battery pack BP temperature is lower than the third set temperature, heating is determined to be required, and the steps proceed to step S24.

Battery heating (heating of the battery stack 2) is started (executed) (time t8) in order to raise the internal temperature of the battery pack BP, in step S24. That is, the PTC heater 36 of the temperature regulation unit 3 is energized, and the blower fan 35 is driven at a rotation rate of 100%. The blower fan 35 is driven by a 12V battery, and this 12V battery is supplied power from the battery pack BP (high power battery) during vehicle startup.

The countdown of the drive time, which was started at time t7 in FIG. 16, is stopped and cleared (overwrite drive time=0 in the memory) in step S25 (time t8), following the start (execution) of battery heating at time t8.

At time t9, since the battery temperature has been increased to equal to or greater than the third set temperature by the battery heating, the battery heating is ended. At this time, the rotation rate is set from 100% to 0% to stop the blower fan 35.

The operation from step S23 to step S25 corresponds to the "condensed water discharge control during battery heating."

Of the operations described above, if the countdown of the drive time is carried out from time t7, that is, if battery heating is executed at time t8 during a condensed water discharge control, the countdown of the drive time is assumed to have ended at time t8 (the drive time is overwritten in the memory to zero).

This is because the air temperature inside the battery pack BP is increased by the battery heating, so the evaporation of the condensed water is promoted more than the discharge of the condensed water by the blower fan 35, and the amount of water of the condensed water which has become water vapor is increased. The relationship between this external pressure and the internal pressure of the battery pack BP caused by this temperature rise is as described in the condensed water discharge control action during vehicle startup described above.

Accordingly, the discharge of condensed water by battery heating is prioritized over the discharge of condensed water by the blower fan 35.

As a result, even more water vapor of the condensed water can be discharged from the vent 17, and the condensed water which has become water vapor becomes even easier to discharge.

Next, the effects are described. The effects listed below can be obtained with the battery temperature regulating device according to the first embodiment.

(1) A battery temperature regulating device, comprising a battery module (battery stack 2);

a temperature detection device (temperature sensor T) for detecting the temperature (battery temperature) of the battery module (battery stack 2);

a battery temperature regulating device (temperature regulation unit 3, temperature regulation controller 52) for adjusting the temperature (battery temperature) of the battery module (battery stack 2); and a battery pack case 1 for housing the battery module (battery stack 2) and the battery temperature regulating device (temperature regulation unit 3, temperature regulation controller 52);

wherein, the battery pack case 1 comprises a vent 17 which allows the passage of gas from inside the battery pack case 1 to the outside, the battery temperature regulating device (temperature regulation unit 3, temperature regulation controller 52) is configured comprising a cooling heat exchanger (evaporator 32) for cooling the air that passes through, condensed water reservoir 33 for storing condensed water that is generated in the cooling heat exchanger (evaporator 32), and an air blowing device (blower fan 35) for blowing the air in the vicinity of the cooling heat exchanger (evaporator 32) and the condensed water reservoir 33 and circulating the same within the battery pack case 1, the battery temperature regulating device (temperature regulation unit 3, temperature regulation controller 52), cools the air that passes through with the cooling heat exchanger (evaporator 32), and drives the air blowing device (blower fan 35) to execute the cooling of the battery module (battery stack 2), when the temperature (battery temperature) of the battery module (battery stack 2) detected by the temperature detection device (temperature sensor T) is higher than a predetermined temperature (first set temperature) which is set in advance, and drives only the air blowing device (blower fan 35) regardless of the temperature (battery temperature) of the battery module (battery stack 2) which is detected by the temperature detection device (temperature sensor T), at a predetermined timing after the execution of the cooling of the battery module (battery stack 2) is completed.

As a result, discharging of the condensed water to the outside of the battery pack case 1 without increasing the layout space becomes possible, by not adding additional drive parts or the like.

(2) The battery pack case 1 is mounted on a vehicle, and the battery module (battery stack 2) is a vehicle power source device for supplying power to vehicle-mounted equipment, and the predetermined timing is the time of the next vehicle startup after executing cooling of the battery module (battery stack 2) (FIG. 12, FIG. 13).

Accordingly, in addition to the effect of (1), more condensed water, which has become water vapor, can be discharged from the vent 17, and the condensed water which has become water vapor becomes even easier to discharge.

(3) The battery temperature regulating device (temperature regulation controller 52) sets the drive output of the air blowing device (blower fan 35) of when driving at the predetermined timing lower than the drive output of the air blowing device (blower fan 35) of when executing cooling of the battery module (battery stack 2).

Accordingly, in addition to the effects of (1)-(2), suppressing noise, vibration, and power consumption by the blower fan 35 becomes possible by reducing the rotation rate of the blower fan 35 to the minimum required rotation rate.

(4) The cooling of the battery module (battery stack 2) is executed only when charging the battery module (battery stack 2).

Accordingly, in addition to the effects of (1)-(3), the space of a portion of the temperature regulation unit 3 can be reduced by optimizing the size of the condensed water reservoir 33 (volume, etc.) according to the generated amount of condensed water.

(5) The battery module (battery stack 2) is configured to be electrically connectable and disconnectable with an external power source (charging station 118), which is a power source outside of the battery pack case 1, and is charged by power that is supplied from the external power source (charging station 118) in a state of being electrically connected with the external power source (charging station 118), and the battery module (battery stack 2) is charged when the battery module (battery stack 2) is connected to the external power source (charging station 118).

Accordingly, the battery stack 2 can be controlled to an optimum temperature without reducing the cruisable distance of the vehicle.

(6) The battery temperature regulating device (temperature regulation controller 52), drives only the air blowing device (blower fan 35) during a predetermined drive time from when starting the driving of only the air blowing device (blower fan 35), determines the drive time from the generated amount of the condensed water, and determines the generated amount of the condensed water from the air volume of the battery pack case 1, the frequency of use of the battery module (battery stack 2) for cooling, and the representative environment temperature and humidity.

As a result, in addition to the effects of (1)-(5), the number of parts in the battery pack case 1 or the temperature regulation unit 3 can be reduced.

(7) The battery temperature regulating device (temperature regulation controller 52) counts the elapsed time from when starting the driving of only the air blowing device (blower fan 35); if the vehicle is stopped before the elapsed time becomes the predetermined drive time, the count is stopped and the difference between the elapsed time and the predetermined drive time is stored, and, during the next vehicle startup, drives only the air blowing device (blower fan 35) until the elapsed time from the vehicle startup becomes the difference between the elapsed time and the predetermined drive time (FIG. 13).

As a result, in addition to the effects of (6), the necessary drive time with respect to the amount of condensed water corresponding to the condensed water that is generated while executing the battery cooling is secured; therefore, improving the discharge reliability of condensed water becomes possible.

(8) The battery temperature regulating device (temperature regulation controller 52) counts the elapsed time from when starting the driving of only the air blowing device (blower fan 35); if the vehicle is stopped before the elapsed time becomes the predetermined drive time, the count is stopped and the difference between the elapsed time and the predetermined drive time is stored, and, if cooling of the battery module (battery stack 2) is executed after the vehicle stop and before the next vehicle startup, resets the stopped count and sets the predetermined drive time (FIG. 12, FIG. 13, FIG. 16).

As a result, in addition to the effects of (6)-(7), the necessary drive time with respect to the additional condensed water that is newly generated is secured; therefore, improving the discharge reliability of condensed water becomes possible.

(9) The battery temperature regulating device (temperature regulation unit 3, temperature regulation controller 52) comprises a heater for heating (PTC heater 36), and if the drive time is being counted and heating of the battery module (battery stack 2) is carried out by driving the heater (PTC heater 36), the battery temperature regulating device (temperature regulation controller 52) stops the count and sets the drive time to zero (FIG. 15, FIG. 16).

As a result, in addition to the effects of (6)-(8), even more water vapor of the condensed water can be discharged from the vent 17, and the condensed water which has become water vapor becomes even easier to discharge.

(10) The battery temperature regulating device (temperature regulation unit 3, temperature regulation controller 52) comprises an air flow path unit (unit case 31, unit duct 37) comprising the condensed water reservoir 33, the air blowing device (blower fan 35) device for blowing the air in the vicinity of the cooling heat exchanger (evaporator 32) and the condensed water reservoir 33 and circulating the same within the battery pack case 1 through the air flow path unit (unit case 31, unit duct 37), a duct (air distribution duct 9) which extends at least to the vicinity of the vent 17 and is connected to the air flow path unit (unit case 31, unit duct 37), and and an air outlet 99 for blowing out the air in the vicinity of the cooling heat exchanger (evaporator 32) and the condensed water reservoir 33, which is blown by the air blowing device (blower fan 35), toward the vent 17, is disposed in the duct (air distribution duct 9).

As a result, in addition to the effects of (1)-(9), improving the discharge reliability of condensed water becomes possible.

The battery temperature regulating device of the present invention was described above based on the first embodiment, but specific configurations thereof are not limited to this embodiment, and various modifications and additions to the design can be made without departing from the scope of the invention according to each claim in the Claims.

In the first embodiment, an example was shown in which the battery pack BP is disposed under the floor of the vehicle. However, the configuration is not limited to that illustrated in the first embodiment. For example, the battery pack may be disposed in the luggage room, etc., of the vehicle.

In the first embodiment, and example of a battery stack 2 (battery modules) in which a plurality of battery modules are stacked was shown as an example of a battery module. However, the configuration is not limited to that illustrated in the first embodiment. For example, battery modules arranged without a plurality thereof being stacked are also included in a battery module.

In the first embodiment, an example of a unit that generates both cold air and warm air was shown as the temperature regulation unit 3. However, the configuration is not limited to that illustrated in the first embodiment. For example, the temperature regulation unit may be a unit that has an evaporator and generates only cold air.

In the first embodiment, an example was shown in which an evaporator 32 is the cooling heat exchanger. However, the invention is not limited to an evaporator 32. That is, any structure capable of removing heat from passing air and generating cold air can be employed. For example, a Peltier element or the like may be employed.

In the first embodiment, an example was shown in which the air blowing device is a blower fan 35. However, the invention is not limited to a blower fan 35. That is, any structure capable of blowing the air (water vapor) in the vicinity of the evaporator 32 and the condensed water reservoir 33 and circulating the same within the battery pack case 1 can be employed. Any structure capable of thereby blowing the air (water vapor) in the vicinity of the evaporator 32 and the condensed water reservoir 33 to the vicinity of the vent 17 can be employed.

In the first embodiment, the rotation rate of the blower fan 35 during the drive time was set to 40%. However, the invention is not limited thereto. For example, the rotation rate may be varied according to the performance of the blower fan 35 and other air blowing device. In addition, the rotation rate may be 40% or greater, in order to increase the discharge efficiency of the condensed water that has become water vapor.

In the first embodiment, an example was shown in which the heater is a PTC heater 36. However, the invention is not limited to a PTC heater 36. That is, any heater capable of heating passing air can be employed.

In the first embodiment, an example using a material (film) such as Gore-Tex (registered trademark) was shown as the configuration of the vent 17. However, the configuration is not limited to that illustrated in the first embodiment. That is, the vent 17 needs only to allow the passage of gas from inside the battery pack case 1 to the outside. In addition, the vent preferably allows the passage of gas from the inside of the battery pack case 1 to the outside, and prevents the passage of liquid from the outside of the battery pack case 1 to the inside.

In the first embodiment, an example was shown in which the air outlet 99 is arranged in a position facing the vent 17. However, the arrangement of the air outlet 99 is not limited thereto. That is, the air outlet can be arranged in any position in which the air in the vicinity of the evaporator 32 and the condensed water reservoir 33, which is blown by the blower fan 35, is blown out toward the vent 17.

In the first embodiment, an example was shown in which there are two vents 17 and air outlets 99. However, the configuration is not limited to that illustrated in the first embodiment. That is, the number/arrangement/shape/size of the vent 17 and air outlet 99 with which condensed water that has become water vapor is most easily discharged may be employed, according to the arrangement, etc., of each component within the battery pack case 1. For example, the number of vents 17 and air outlets 99 may be one or equal to or greater than three, and the number of vents 17 and air outlets 99 may be different. In addition, the arrangements, shapes, and sizes thereof may be the same for both the vent 17 and the air outlet 99, or varied among the vents 17 when two or more vents 17 are provided. The same shall apply to the air outlets 99.

In the first embodiment, an example was shown in which a temperature regulation unit 3 and an air distribution duct 9 are arranged in the internal space of the battery pack case 1. However, the configuration is not limited to that illustrated in the first embodiment. For example, a configuration lacking an air distribution duct may be employed, in which only a temperature regulation unit is arranged in the internal space of the battery pack case to distribute air to the battery stack via the gap between the unit duct and the battery stack.

In the first embodiment, a configuration was shown in which the air flow path unit (unit case 31, unit duct 37) includes a condensed water reservoir 33 for storing condensed water. However, the configuration is not limited to that illustrated in the first embodiment. For example, the air flow path unit may comprise a moisture absorption sheet (condensed water surface area increase processing part) for increasing the surface area of the condensed water from the condensed water reservoir 33 to within the air flow path unit (unit case 31, unit duct 37), continuously to a portion with a relatively fast wind speed containing water vapor of the condensed water. Specifically, a water-absorbent material can be provided, or, hydrophilic processing may be applied to the surface of the condensed water reservoir 33 itself. Since the evaporation of the condensed water is thereby promoted, more condensed water can be discharged as water vapor.

In the first embodiment, an example was shown in which the timing for starting (predetermined timing) the condensed water discharge control is at the time of the next vehicle startup after executing battery cooling. That is, the condensed water discharge control may be started at a different timing at which pressure difference occurs between the external pressure and the internal pressure of the battery pack BP. For example, the start timing may be set to night, morning, or when the outside air temperature is low, etc., when a pressure difference occurs. However, in the case of night or morning, the above-described control is carried out by driving the blower fan 35 on the basis of a timer or the like. Additionally, when the outside air temperature is low, the above-described control is carried out by driving the blower fan 35 by detecting the outside air temperature, or, on the basis of the outside air temperature and the air temperature inside the battery pack BP (battery temperature). Pressure difference thereby occurs between the external pressure and the internal pressure of the battery pack BP, and the water vapor of the condensed water can be more easily discharged.

In the first embodiment, an example was shown in which battery cooling is carried out only during charging. However, battery cooling is not limited to during charging shown in the first embodiment. For example, battery cooling can be carried out even during vehicle startup, if the internal temperature of the battery pack BP has become higher than the first set temperature. However, in order to discharge the newly generated condensed water, as described in "Condensed water discharge control action during battery cooling" a predetermined time that is set in advance based on step S13 in FIG. 12 is set again as the drive time to carry out the condensed water discharge control.

In the first embodiment, an example was shown in which the battery temperature regulating device of the present invention is applied to an electric vehicle equipped with only a traveling motor as a traveling drive source. However, the invention is not limited to the electric vehicle of the first embodiment. That is, the battery temperature regulating device of the present invention may also be applied to a hybrid vehicle equipped with a traveling motor and an engine as traveling drive sources.

The invention claimed is:

1. A battery temperature regulating device comprising:
a battery module;
a temperature detection device configured to detect a temperature of the battery module;
a battery temperature regulating device configured to adjust the temperature of the battery module; and
a battery pack case housing the battery module and the battery temperature regulating device,
the battery pack case including a vent configured to enable passage of gas from inside the battery pack case to outside,
the battery temperature regulating device including
a cooling heat exchanger configured to cool air that passes therethrough,
a condensed water reservoir configured to store condensed water generated in the cooling heat exchanger, and
an air blowing device configured to blow the air in the vicinity of the cooling heat exchanger and the condensed water reservoir and circulate the air within the battery pack case,
the battery temperature regulating device is configured to cool the air that passes through the cooling heat exchanger,
drive the air blowing device to execute the cooling of the battery module when the temperature of the battery module detected by the temperature detection device is higher than a predetermined temperature,
drive only the air blowing device regardless of the temperature of the battery module detected by the temperature detection device, at a predetermined timing after the execution of the cooling of the battery module is completed, and
set a drive output of the air blowing device when driving at the predetermined timing lower than the drive output of the air blowing device when executing cooling of the battery module.

2. The battery temperature regulating device according to claim 1, wherein
the battery pack case is configured to be mounted on a vehicle,
the battery module is a vehicle power source device configured to supply power to vehicle-mounted equipment, and
the predetermined timing is a time of a vehicle startup after executing cooling of the battery module.

3. The battery temperature regulating device according to claim 1, wherein
the cooling of the battery module is executed only when charging the battery module.

4. The battery temperature regulating device according to claim 3, wherein
the battery module is configured to be electrically connectable and disconnectable to an external power source, the external power source being a power source outside of the battery pack case, the battery module being configured to be charged by power supplied by the external power source in a state of being electrically connected to the external power source, and
the battery module is configured to be charged when the battery module is connected to the external power source.

5. The battery temperature regulating device according to claim 1, wherein
the battery temperature regulating device is configured to drive only the air blowing device during a predetermined drive time from a start of the driving of only the air blowing device,
determine a drive time from the generated amount of the condensed water, and
determine the generated amount of the condensed water from an air volume of the battery pack case, frequency of use of the battery module for cooling, and a representative environment temperature and humidity.

6. The battery temperature regulating device according to claim 5, wherein
the battery temperature regulating device is configured to count an elapsed time from a start of driving of only the air blowing device,
when the vehicle is stopped before the elapsed time becomes the predetermined drive time, is configured to stop the count and store the difference between the elapsed time and the predetermined drive time, and
during a vehicle startup, is configured to drive only the air blowing device until the elapsed time from the vehicle startup becomes the difference between the elapsed time and the predetermined drive time.

7. The battery temperature regulating device according to claim 5, wherein
the battery temperature regulating device is configured to count an elapsed time from when starting the driving of only the air blowing device,
when the vehicle is stopped before the elapsed time becomes the predetermined drive time, is configured to stop the count and store the difference between the elapsed time and the predetermined drive time, and
when cooling of the battery module is executed after a vehicle stop and before a vehicle startup, is configured to reset the stopped count and set the predetermined drive time.

8. The battery temperature regulating device according to claim 5, wherein
the battery temperature regulating device includes a heater for heating, and
when the drive time is being counted and heating of the battery module is carried out by driving the heater, the battery temperature regulating device is configured to stop the count and set the drive time to zero.

9. The battery temperature regulating device according to claim 1, wherein
the battery temperature regulating device includes an air flow path unit comprising
the condensed water reservoir,
the air blowing device configured to blow the air in the vicinity of the cooling heat exchanger and the condensed water reservoir and circulate the air within the battery pack case through the air flow path unit,
a duct extending at least to a vicinity of the vent connected to the air flow path unit, and
an air outlet configured to blow out the air in the vicinity of the cooling heat exchanger and the condensed water reservoir, which is blown by the air blowing device, toward the vent, disposed in the duct.

10. The battery temperature regulating device according to claim 2, wherein
the cooling of the battery module is executed only when charging the battery module.

11. The battery temperature regulating device according to claim 2, wherein
the battery temperature regulating device is configured to drive only the air blowing device during a predetermined drive time from a start of the driving of only the air blowing device,
determine a drive time from the generated amount of the condensed water, and
determine the generated amount of the condensed water from an air volume of the battery pack case, frequency of use of the battery module for cooling, and a representative environment temperature and humidity.

12. The battery temperature regulating device according to claim 3, wherein
the battery temperature regulating device is configured to drive only the air blowing device during a predetermined drive time from a start of the driving of only the air blowing device,
determine a drive time from the generated amount of the condensed water, and
determine the generated amount of the condensed water from an air volume of the battery pack case, frequency of use of the battery module for cooling, and a representative environment temperature and humidity.

13. The battery temperature regulating device according to claim 4, wherein
the battery temperature regulating device is configured to drive only the air blowing device during a predetermined drive time from a start of the driving of only the air blowing device,
determine a drive time from the generated amount of the condensed water, and
determine the generated amount of the condensed water from an air volume of the battery pack case, frequency of use of the battery module for cooling, and a representative environment temperature and humidity.

14. The battery temperature regulating device according to claim 6, wherein
the battery temperature regulating device is configured to count the elapsed time from when starting the driving of only the air blowing device,
when the vehicle is stopped before the elapsed time becomes the predetermined drive time, is configured to stop the count and store the difference between the elapsed time and the predetermined drive time, and
when cooling of the battery module is executed after a vehicle stop and before the vehicle startup, is configured to reset the stopped count and set the predetermined drive time.

15. The battery temperature regulating device according to claim 6, wherein
the battery temperature regulating device includes a heater for heating, and
when the drive time is being counted and heating of the battery module is carried out by driving the heater, the battery temperature regulating device is configured to stop the count and set the drive time to zero.

16. The battery temperature regulating device according to claim 7, wherein
the battery temperature regulating device includes a heater for heating, and
when the drive time is being counted and heating of the battery module is carried out by driving the heater, the battery temperature regulating device is configured to stop the count and set the drive time to zero.

17. The battery temperature regulating device according to claim 2, wherein
the battery temperature regulating device includes an air flow path unit comprising
the condensed water reservoir,
the air blowing device configured to blow the air in the vicinity of the cooling heat exchanger and the condensed water reservoir and circulate the air within the battery pack case through the air flow path unit,
a duct extending at least to a vicinity of the vent connected to the air flow path unit, and
an air outlet configured to blow out the air in the vicinity of the cooling heat exchanger and the condensed water reservoir, which is blown by the air blowing device, toward the vent, disposed in the duct.

18. The battery temperature regulating device according to claim 3, wherein
the battery temperature regulating device includes an air flow path unit comprising
the condensed water reservoir,
the air blowing device configured to blow the air in the vicinity of the cooling heat exchanger and the condensed water reservoir and circulate the air within the battery pack case through the air flow path unit,
a duct extending at least to a vicinity of the vent connected to the air flow path unit, and
an air outlet configured to blow out the air in the vicinity of the cooling heat exchanger and the condensed water reservoir, which is blown by the air blowing device, toward the vent, disposed in the duct.

* * * * *